(12) United States Patent
Park et al.

(10) Patent No.: US 10,666,940 B2
(45) Date of Patent: May 26, 2020

(54) VIDEO ENCODING METHOD AND APPARATUS, AND VIDEO DECODING METHOD AND APPARATUS

(71) Applicant: SAMSUNG ELECTRONICS CO., LTD., Suwon-si (KR)

(72) Inventors: Chan-yul Park, Suwon-si (KR); Jung-hye Min, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/525,193

(22) PCT Filed: Nov. 6, 2015

(86) PCT No.: PCT/KR2015/011873
§ 371 (c)(1),
(2) Date: May 8, 2017

(87) PCT Pub. No.: WO2016/072775
PCT Pub. Date: May 12, 2016

(65) Prior Publication Data
US 2018/0288410 A1    Oct. 4, 2018

Related U.S. Application Data

(60) Provisional application No. 62/075,987, filed on Nov. 6, 2014.

(51) Int. Cl.
*H04N 19/176* (2014.01)
*H04N 19/107* (2014.01)
(Continued)

(52) U.S. Cl.
CPC ........... *H04N 19/107* (2014.11); *H04N 19/10* (2014.11); *H04N 19/105* (2014.11);
(Continued)

(58) Field of Classification Search
CPC .. A61K 2800/5426; A61K 8/342; A61K 8/39; A61K 8/416; A61K 8/44;
(Continued)

(56) References Cited

U.S. PATENT DOCUMENTS 8,085,846 B2    12/2011   Tourapis et al.
9,609,343 B1 *   3/2017   Chen ................... H04N 19/107
(Continued)

FOREIGN PATENT DOCUMENTS

CN    101877785 A    11/2010
CN    102123277 A     7/2011
(Continued)

OTHER PUBLICATIONS

Communication dated Feb. 25, 2016 issued by the International Searching Authority in counterpart International Application No. PCT/KR2015/011873 (PCT/ISA/210/237).
(Continued)

*Primary Examiner* — MD N Haque
(74) *Attorney, Agent, or Firm* — Sughrue Mion, PLLC

(57) ABSTRACT

Provided are a method and apparatus for performing combination prediction by obtaining a weight for intra prediction and inter prediction by taking into account at least one of a distance between a reference picture and a current picture, a size of a current block, and characteristics of the inter prediction and intra prediction. An image decoding method according to the present disclosure includes parsing, from a bitstream, combination prediction information indicating whether to predict a current block by combining intra prediction and inter prediction; determining whether to perform combination prediction on the current block, based on the combination prediction information; obtaining, when the combination prediction is performed, a first prediction value by performing the inter prediction on the current
(Continued)

block, and obtaining a second prediction value by performing the intra prediction on the current block; determining a weight for the inter prediction and a weight for the intra prediction, based on at least one of a distance between a reference picture and a current picture, a size of the current block, and characteristics of the inter prediction and the intra prediction; and performing the combination prediction, based on the weight for the inter prediction, the weight for the intra prediction, the first prediction value, and the second prediction value.

14 Claims, 15 Drawing Sheets

(51) Int. Cl.
*H04N 19/10* (2014.01)
*H04N 19/157* (2014.01)
*H04N 19/463* (2014.01)
*H04N 19/139* (2014.01)
*H04N 19/46* (2014.01)
*H04N 19/105* (2014.01)
*H04N 19/186* (2014.01)
*H04N 19/182* (2014.01)
*H04N 19/523* (2014.01)
*H04N 19/593* (2014.01)

(52) U.S. Cl.
CPC ......... *H04N 19/139* (2014.11); *H04N 19/157* (2014.11); *H04N 19/176* (2014.11); *H04N 19/182* (2014.11); *H04N 19/186* (2014.11); *H04N 19/46* (2014.11); *H04N 19/463* (2014.11); *H04N 19/523* (2014.11); *H04N 19/593* (2014.11)

(58) Field of Classification Search
CPC .......... A61K 8/463; A61K 8/73; A61K 8/731; A61K 8/817; A61K 8/891; A61Q 5/02; A61Q 5/06; A61Q 5/12
See application file for complete search history.

(56) References Cited

U.S. PATENT DOCUMENTS

| | | | | |
|---|---|---|---|---|
| 2007/0098067 | A1* | 5/2007 | Kim | H04N 19/176 375/240.08 |
| 2007/0274388 | A1* | 11/2007 | Lee | H04N 19/132 375/240.13 |
| 2008/0187043 | A1* | 8/2008 | Ahn | H04N 19/139 375/240.03 |
| 2012/0230405 | A1 | 9/2012 | An et al. | |
| 2014/0003522 | A1* | 1/2014 | Park | H04N 19/105 375/240.16 |
| 2014/0050265 | A1 | 2/2014 | Josh et al. | |
| 2014/0072041 | A1 | 3/2014 | Seregin et al. | |

FOREIGN PATENT DOCUMENTS

| | | |
|---|---|---|
| KR | 2002-0042935 A | 6/2002 |
| KR | 10-2007-0047522 A | 5/2007 |
| KR | 10-2008-0066706 A | 7/2008 |
| KR | 10-1050828 B1 | 7/2011 |
| WO | 2008004940 A1 | 1/2008 |

OTHER PUBLICATIONS

Cha et al; "Improved Combined Inter-Intra Prediction Using Spatial-Variant Weighted Coefficient"; IEEE International Conference on Multimedia and Expo (ICME); Jul. 2011; 5 pgs. total.

Chen et al; "Joint Inter-Intra Prediction Based on Mode-Variant and Edge-Directed Weighting Approaches in Video Coding"; IEEE International Conference on Acoustic, Speech and Signal Processing (ICASSP); May 2014 pp. 7372-7376; 5 pgs. Total.

Sullivan et al; "Overview of the High Efficiency Video Coding (HEVC) Standard"; IEEE Transactions on Circuits and Systems for Video Technology; vol. 22; No. 12; Dec. 2012; pp. 1649-1668; 20 pgs. total.

Communication dated Oct. 11, 2017, from the European Patent Office in counterpart European Application No. 15857835.1.

Communication dated Jun. 18, 2019, issued by the State Intellectual Property Office of P.R. China in counterpart Chinese Application No. 201580070271.7.

* cited by examiner

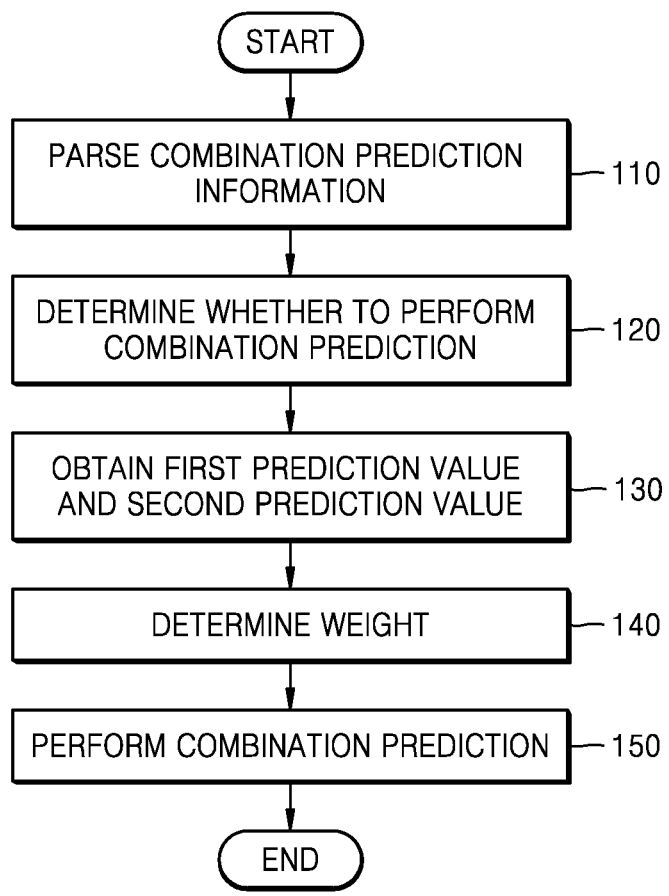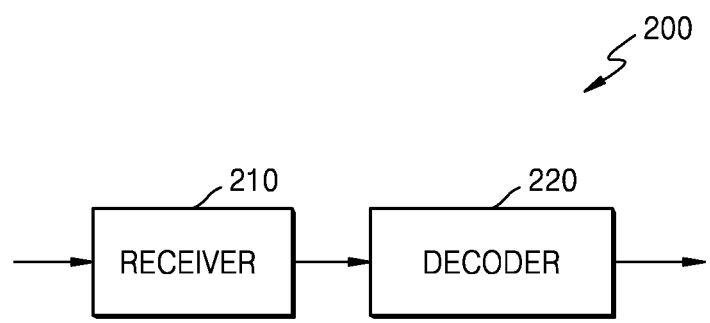

FIG. 13
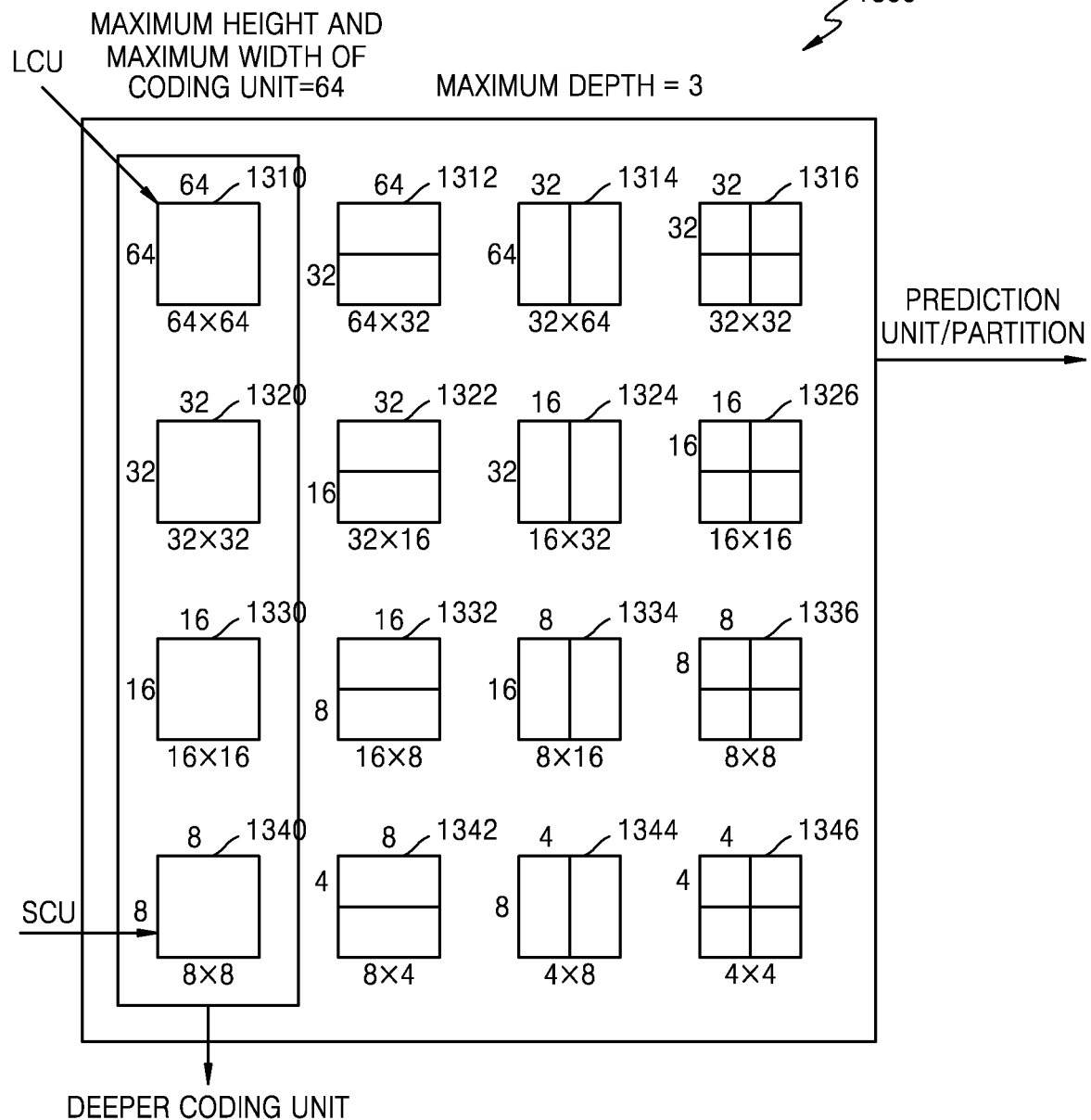
FIG. 14
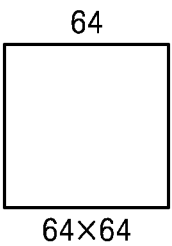
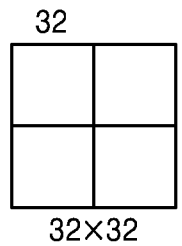

FIG. 15
PARTITION MODE (1500)
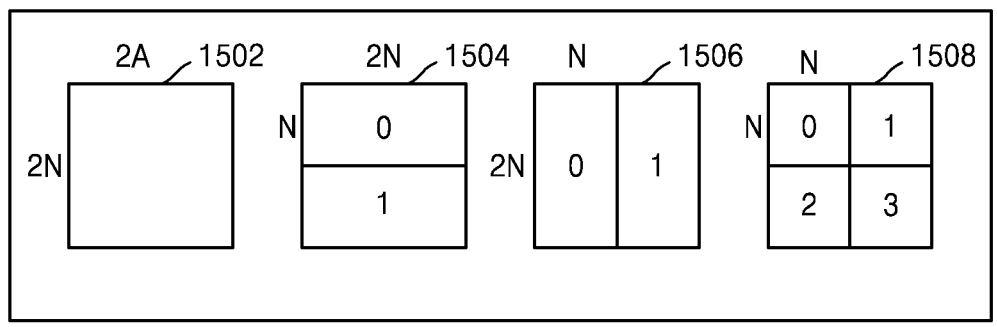
PREDICTION MODE (1510)
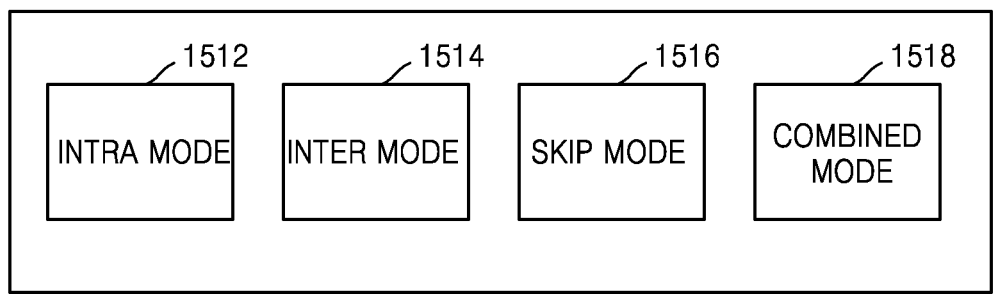
SIZE OF TRANSFORMATION UNIT (1520)
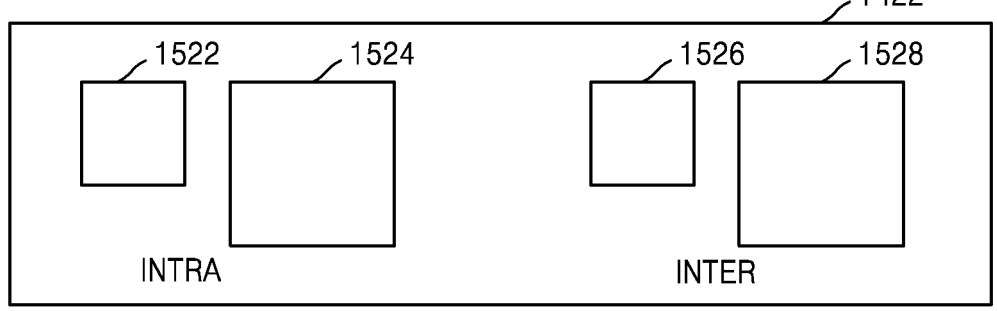

CODING UNIT (1710)

PREDICTION UNIT (1760)

VIDEO ENCODING METHOD AND APPARATUS, AND VIDEO DECODING METHOD AND APPARATUS

TECHNICAL FIELD

The present disclosure relates to encoding and decoding of a still image or video by combining an intra prediction result and an inter prediction result.

BACKGROUND ART

As hardware for reproducing and storing high resolution or high quality video content is being developed and supplied, a need for a video codec for effectively encoding or decoding the high resolution or high quality video content is increasing.

A convention image decoding/encoding video codec predicts a current block by using one of intra prediction and inter prediction. The intra prediction is a prediction technology of allowing only a spatial reference, and the inter prediction is a compression method of deleting redundancy in data by referring to a previously-encoded image. The image decoding/encoding video codec uses only one of a spatial reference and a temporal reference, thus, there is a problem that not all of a spatial characteristic and temporal characteristic of an image are reflected.

DETAILED DESCRIPTION OF THE INVENTION

Technical Problem

The present disclosure provides a method and apparatus for obtaining a weight for intra prediction and inter prediction by taking into account at least one of a distance between a reference picture and a current picture, a size of a current block, and characteristics of the inter prediction and intra prediction in combination prediction. The present disclosure also provides a technology of applying combination prediction to an image codec with a free structure.

Technical Solution

According to an aspect of the present disclosure, there is provided an image decoding method including parsing, from a bitstream, combination prediction information indicating whether to predict a current block by combining intra prediction and inter prediction; determining whether to perform combination prediction on the current block, based on the combination prediction information; obtaining, when the combination prediction is performed, a first prediction value by performing the inter prediction on the current block, and obtaining a second prediction value by performing the intra prediction on the current block; determining a weight for the inter prediction and a weight for the intra prediction, based on at least one of a distance between a reference picture and a current picture, a size of the current block, and characteristics of the inter prediction and the intra prediction; and performing the combination prediction, based on the weight for the inter prediction, the weight for the intra prediction, the first prediction value, and the second prediction value.

The image decoding method may further include parsing usable mode information from the bitstream; selecting, based on the usable mode information, usable modes from among a plurality of modes related to a prediction direction comprised in the intra prediction; and determining a weight for each of the usable modes.

The image decoding method may further include parsing usable mode information from the bitstream; selecting, based on the usable mode information, usable modes from among a plurality of modes corresponding to a plurality of reference blocks to be referred to by the current block, the plurality of modes being comprised in the inter prediction; and determining a weight for each of the usable modes.

The performing of the combination prediction may include calculating Equation of (the weight for the inter prediction X the first prediction value)+(the weight for the intra prediction X the second prediction value).

The performing of the combination prediction may include performing the combination prediction on a luminance channel; and performing one of the inter prediction and the intra prediction on a chrominance channel.

The image decoding method may further include parsing motion vector accuracy information from the bitstream; and setting accuracy of a motion vector in the inter prediction for the current block to be one of a half-pel, an integer-pel, and a 2-pel, based on the motion vector accuracy information.

The determining of the weight may include parsing weight information about the current block from the bitstream; and determining the weight for the inter prediction and the weight for the intra prediction, based on the weight information.

The current block may include a prediction unit used in the inter prediction and a prediction unit used in the intra prediction, wherein the prediction unit used in the inter prediction is independently determined from the prediction unit used in the intra prediction.

The determining of the weight may include determining a reference weight that is an initial weight for the inter prediction; determining a reference distance between the reference picture of the inter prediction and the current picture comprising the current block; determining a difference between the reference distance and the distance between the reference picture of the inter prediction and the current picture comprising the current block; and determining the weight for the inter prediction, based on the reference weight and the difference between the distances.

According to an aspect of the present disclosure, there is provided a non-transitory computer-readable recording medium having recorded thereon a program for implementing the image decoding method.

According to an aspect of the present disclosure, there is provided an image decoding apparatus including a receiver configured to parse, from a bitstream, combination prediction information indicating whether to predict a current block by combining intra prediction and inter prediction; and a decoder configured to determine whether to perform combination prediction on the current block, based on the combination prediction information, to obtain, when the combination prediction is performed, a first prediction value by performing the inter prediction on the current block, and obtaining a second prediction value by performing the intra prediction on the current block, to determine a weight for the inter prediction and a weight for the intra prediction, based on at least one of a distance between a reference picture and a current picture, a size of the current block, and characteristics of the inter prediction and the intra prediction, and to perform the combination prediction, based on the weight for the inter prediction, the weight for the intra prediction, the first prediction value, and the second prediction value.

According to an aspect of the present disclosure, there is provided an image encoding method including obtaining a first prediction value by performing inter prediction on a current block; obtaining a second prediction value by performing intra prediction on the current block; determining a weight for the inter prediction and a weight for the intra prediction, based on at least one of a distance between a reference picture and a current picture, a size of the current block, and characteristics of the inter prediction and the intra prediction; performing combination prediction, based on the weight for the inter prediction, the weight for the intra prediction, the first prediction value, and the second prediction value; determining combination prediction information regarding whether to perform the combination prediction on the current block; and transmitting a bitstream comprising at least one of the combination prediction information and weight information using the weight.

The image encoding method may further include performing entropy coding on at least one of the combination prediction information and the weight information with a lower priority than results of the intra prediction and the inter prediction.

The e determining of the weight may include determining the weight based on a sample value of an original pixel in the current block, the first prediction value, and the second prediction value.

The determining of the weight may include calculating the weight based on an expected value of a ratio of the sample value of the original pixel to the first prediction value and an expected value of a ratio of the sample value of the original pixel to the second prediction value.

According to an aspect of the present disclosure, there is provided an image encoding apparatus including an encoder configured to obtain a first prediction value by performing inter prediction on a current block, to obtain a second prediction value by performing intra prediction on the current block, to determine a weight for the inter prediction and a weight for the intra prediction, based on at least one of a distance between a reference picture and a current picture, a size of the current block, and characteristics of the inter prediction and the intra prediction, to perform combination prediction, based on the weight for the inter prediction, the weight for the intra prediction, the first prediction value, and the second prediction value, to determine combination prediction information regarding whether to perform the combination prediction on the current block; and a transmitter configured to transmit a bitstream comprising at least one of the combination prediction information and weight information using the weight.

DESCRIPTION OF THE DRAWINGS

FIG. 1 illustrates a flowchart of an image decoding method, according to an embodiment of the present disclosure.

FIG. 2 illustrates a block diagram of an image decoding apparatus, according to an embodiment of the present disclosure.

FIG. 13 illustrates deeper coding units according to depths, and partitions, according to an embodiment of the present disclosure.

FIG. 14 illustrates a relationship between a coding unit and transformation units, according to an embodiment of the present disclosure.

FIG. 15 illustrates a plurality of pieces of encoding information according to depths, according to an embodiment of the present disclosure.

MODE OF THE INVENTION

Figure 3:
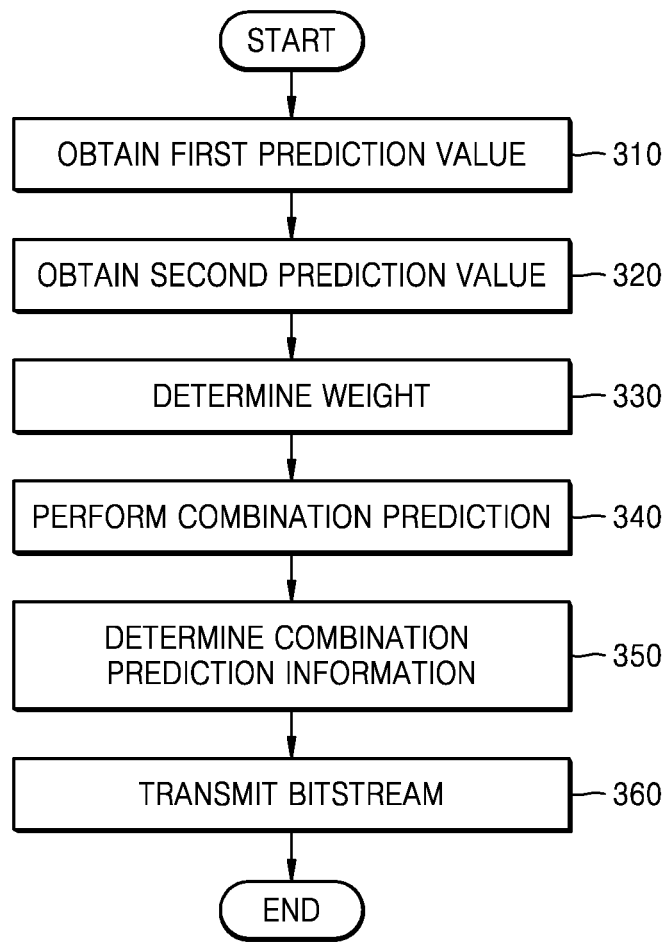
FIG. 3 illustrates a flowchart of an image encoding method, according to an embodiment of the present disclosure.

Hereinafter, with reference to FIGS. 1 through 9, an image encoding apparatus and an image decoding apparatus, and a video encoding method and a video decoding method according to embodiments of the present disclosure will now be described.

FIG. 1 illustrates a flowchart of an image decoding method, according to an embodiment of the present disclosure.

The image decoding method according to an embodiment may be performed by an image decoding apparatus 200. The image decoding apparatus 200 may include parsing, from a bitstream, combination prediction information indicating whether to predict a current block by combining intra prediction and inter prediction (operation 110). The image decoding apparatus 200 may include determining whether to perform a combination prediction on the current block, based on the combination prediction information (operation 120). When the combination prediction is performed, the image decoding apparatus 200 may include obtaining a first prediction value by performing inter prediction on the current block, and obtaining a second prediction value by performing intra prediction on the current block (operation 130). In addition, the image decoding apparatus 200 may include determining a weight for the inter prediction and a weight for the intra prediction, based on at least one of a distance between a reference picture and a current picture, a size of the current block, and characteristics of the inter prediction and intra prediction (operation 140). In addition, the image decoding apparatus 200 may include performing the combination prediction, based on the weight for the inter prediction, the weight for the intra prediction, the first prediction value, and the second prediction value (operation 150).

The current block may be a base block with respect to encoding or decoding an image. In addition, the current block may be a block for prediction. The current block may be a block for transformation. For example, the current block may be a coding unit, a prediction unit, or a transformation unit. The coding unit, the prediction unit, and the transformation unit will be described in detail with reference to FIGS. 10 through 20.

The intra prediction (or intra-frame prediction) refers to a prediction technique of allowing only a spatial reference, and is a method of predicting a current block by referring to samples adjacent to a block to be encoded.

The inter prediction (or inter-frame prediction) is a compression method of deleting redundancy in data by referring to a previously-encoded image. In general, an image includes high temporal correlation compared to spatial correlation, thus, a prediction signal having a high similarity can be generated by referring to the previously-encoded image.

The combination prediction is prediction that combines the intra prediction and the inter prediction. For example, the image decoding apparatus 200 may obtain the first prediction value that is a sample value reconstructed through the inter prediction and the second prediction value that is a sample value reconstructed through the intra prediction, may multiply a predetermined weight by each of the first prediction value and the second prediction value, and may predict a sample value by summing the first prediction value and the second prediction value to which the weight has been applied. This is expressed by Equation (1) below.

Combination prediction value=(weight on inter prediction*first prediction value)+(weight on intra prediction*second prediction value) (1)

The inter prediction uses correlation between frames. Thus, when a distance between a current picture including a current block and a reference picture including a block to be referred to by the current block is increased, accuracy of prediction may deteriorate. Thus, in this case, the image decoding apparatus 200 performs prediction with a large weight on the intra prediction that uses information within a same picture, thereby predicting the sample value with high accuracy.

The intra prediction predicts a sample value in the current block by using information of a previously-reconstructed block in a frame. Since the previously-reconstructed block is located left or above the current block, when a sample value is in the lower right of the current block, accuracy of prediction of the sample value through the intra prediction may deteriorate. Thus, in this case, the image decoding apparatus 200 may predict the lower-right sample value with increased accuracy by granting a more weight on the inter prediction.

The combination prediction information indicates whether to perform prediction by combining the intra prediction and the inter prediction. The combination prediction information may be flag. For example, when the combination prediction information indicates '1', the image decoding apparatus 200 may perform the combination prediction. When the combination prediction information indicates '0', the image decoding apparatus 200 may not perform the combination prediction. Instead, the image decoding apparatus 200 may perform the intra prediction or the inter prediction based on predetermined information.

The image decoding apparatus 200 according to an embodiment of the present disclosure may parse, from the bitstream, split information indicating whether a current coding unit is split to a lower depth. The image decoding apparatus 200 may determine whether to split the current coding unit into smaller coding units, based on the split information. When the split information indicates that the current coding unit is no longer split, the image decoding apparatus 200 may parse the combination prediction information from the bitstream. In addition, the image decoding apparatus 200 may determine whether to perform the combination prediction, based on the combination prediction information.

The image decoding apparatus 200 according to another embodiment of the present disclosure may parse, from the bitstream, skip information indicating whether to skip the current coding unit. The skip information indicates whether an additional syntax element excluding index information for merging is not signaled. When the skip information indicates that the current coding unit is not skipped, the image decoding apparatus 200 may parse the combination prediction information from the bitstream. In addition, the image decoding apparatus 200 may determine whether to perform the combination prediction, based on the combination prediction information. In addition, when the skip information indicates that the current coding unit is skipped, the image decoding apparatus 200 may parse the combination prediction information.

The image decoding apparatus 200 may determine the weight for the inter prediction and the weight for the intra prediction, based on at least one of the distance between the reference picture and the current picture, the size of the current block, and characteristics of the inter prediction and intra prediction.

The image decoding apparatus 200 may determine a reference weight that is an initial weight for the inter prediction. The image decoding apparatus 200 may determine a reference distance between the reference picture of the inter prediction and the current picture including the current. In addition, the image decoding apparatus 200 may determine a difference between the reference distance and the distance between the reference picture of the inter prediction and the current picture including the current block. In addition, the image decoding apparatus 200 may determine the weight for the inter prediction, based on the reference weight and the difference between the distances.

The distance between the reference picture and the current picture may be indicated as a difference between picture order counts (POCs). The POC indicates each of relative output orders of pictures existing in a same coded video sequence (CVS). When a difference between a POC of the reference picture and a POC of the current picture is large, a distance between the reference picture and the current picture is distant. When the distance between the reference picture of the inter prediction and the current picture including the current block is increased, the image decoding apparatus 200 may apply a function of decreasing the weight for the inter prediction. The function may be expressed by Equation (2) below.

$$\text{Weight for inter prediction} = \text{reference weight} + (\text{reference distance} - \text{distance between reference picture and current picture})*k \quad (2)$$

In this regard, k refers to a gradient of a weight according to a change in a distance. k may have a positive real number. When the distance between the reference picture and the current picture is increased, the image decoding apparatus 200 may decrease the weight for the inter prediction, based on the function. On the contrary, when the distance between the reference picture and the current picture is decreased, the image decoding apparatus 200 may increase the weight for the inter prediction.

The image decoding apparatus 200 may determine the reference weight. The reference weight may be an initial value of a weight used in the combination prediction. The reference weight may include a reference weight for the intra prediction and a reference weight for the inter prediction. The reference weight may be included in the bitstream. When the image decoding apparatus 200 parses the reference weight for the intra prediction, the image decoding apparatus 200 may obtain the reference weight for the inter prediction by subtracting the reference weight for the intra prediction from '1'. Alternatively, the reference weight may not be included in the bitstream and may be a preset value in the image decoding apparatus 200 and an image encoding apparatus 400.

The image decoding apparatus 200 may determine the reference distance. The reference distance is a distance to be a base with respect to the reference picture and the current picture. When the distance between the current picture and the reference picture is equal to the reference distance, the weight for the intra prediction may be equal to the reference weight for the intra prediction. When the distance between the current picture and the reference picture is equal to the reference distance, the weight for the inter prediction may be equal to the reference weight for the inter prediction. The reference distance may be included in the bitstream. Alternatively, the reference distance may be a preset value in the image decoding apparatus 200 and the image encoding apparatus 400.

For example, the image decoding apparatus 200 may set each of the initial weight for the inter prediction and an initial reference weight for the intra prediction to be 0.5. In addition, when the distance between the reference picture and the current picture is decreased with respect to the reference distance by a predetermined distance, the image decoding apparatus 200 may increase the weight for the inter prediction by 0.1. On the contrary, the image decoding apparatus 200 may decrease the weight for the intra prediction by 0.1.

The image decoding apparatus 200 may determine the weight for the inter prediction and the weight for the intra prediction, based on the size of the current block. For example, when the size of the current block is larger than a predetermined size, accuracy of the intra prediction may deteriorate in the lower right of the current block. Thus, when the size of the current block is increased, the image decoding apparatus 200 may increase the weight for the inter prediction. Therefore, the image decoding apparatus 200 may increase an effect of the inter prediction in the combination prediction.

For example, the image decoding apparatus 200 may set each of the initial weight for the inter prediction and the initial reference weight for the intra prediction to be 0.5. In addition, when the size of the current block is larger than the predetermined size, the image decoding apparatus 200 may increase the weight for the inter prediction by 0.1.

The image decoding apparatus 200 may determine the weight for the inter prediction and the weight for the intra prediction, based on the characteristics of the inter prediction and intra prediction. As described above, in the inter prediction, when the distance between the current picture including the current block and the reference picture including the block to be referred to by the current block is increased, accuracy of prediction may deteriorate. In the intra prediction, accuracy of prediction of a sample value through the intra prediction may deteriorate when the sample value is in the lower right of the current block. Thus, when the image decoding apparatus 200 performs the combination prediction in the current block, the image decoding apparatus 200 may increase the weight for the inter prediction and decrease the weight for the intra prediction with respect to lower right pixels. On the contrary, when the image decoding apparatus 200 performs the combination prediction in the current block, the image decoding apparatus 200 may decrease the weight for the inter prediction and increase the weight for the intra prediction with respect to upper left pixels.

For example, the image decoding apparatus 200 may set each of the initial weight for the inter prediction and the initial reference weight for the intra prediction to be 0.5. When the image decoding apparatus 200 predicts the current block, the image decoding apparatus 200 may gradually increase the weight for the inter prediction with respect to the lower right pixels.

While the reference weight is set to be 0.5 in the above, the reference weight is not limited thereto. In addition, the image decoding apparatus 200 may determine the reference weight to be the weight for the intra prediction or the weight for the inter prediction.

The image decoding apparatus 200 may parse, from the bitstream, weight information about the current block. The weight information may include the reference weight, and the weight for the inter prediction and the weight for the intra prediction with respect to the current block. For example, the weight information may include weights for all pixels in the current block. Alternatively, the weight information may include a weight for each of a plurality of regions split from the current block. Since the sum of the weight for the inter prediction and the weight for the intra prediction is 1, the image decoding apparatus 200 may obtain only one of the weight for the inter prediction and the weight for the intra prediction.

The weights included in the weight information may be expressed as a matrix. For example, the weight information may be information of values of the weights according to coordinates in the current block, the information being expressed as the matrix. In addition, the weight information may be information of a value of a weight according to the distance between the current picture and the reference picture, the information being expressed as the matrix.

The weight information may be expressed as a function. For example, the weight information may be a function indicating the value of the weight according to the distance between the current picture and the reference picture. In addition, the weight information may be a function indicating the values of the weights according to the coordinates in the current block.

The weight information may include information for obtaining the weight for the inter prediction and the weight for the intra prediction. The image decoding apparatus 200 may determine a weight based on the weight information. For example, the weight information may include the reference weight. The image decoding apparatus 200 may determine a weight for each pixel, based on at least one of the reference weight, the distance between the reference picture and the current picture, the size of the current block, and the characteristics of the inter prediction and intra prediction. The weight information may be received according to each of blocks or each of slices.

Each of the intra prediction and the inter prediction may include a plurality of modes. For example, the intra prediction may include a planar mode, a DC mode, and a plurality of modes associated with a direction. For the inter prediction, the image decoding apparatus 200 may generate a uni-directional motion prediction candidate or may generate a bidirectional motion prediction candidate. For the inter prediction, the image decoding apparatus 200 may determine a reference block of the current block to be located left or above the current block or to be in a picture that is reconstructed before the current picture.

The image decoding apparatus 200 may determine a weight for each of usable modes from among a plurality of modes (e.g., the planar mode, the DC mode, and the plurality of modes (intra_Angular) associated with a direction) related to a prediction direction included in the intra prediction. The image decoding apparatus 200 may determine a weight for each of usable modes from among a plurality of modes related to a plurality of reference blocks to be referred to by the current block. The image decoding apparatus 200 may determine a weight for each of usable modes from among a plurality of modes related to a uni-directional prediction candidate or a bidirectional prediction candidate included in the inter prediction.

The image decoding apparatus 200 may select usable modes based on the bitstream. For example, the image decoding apparatus 200 may parse usable mode information from the bitstream. The image decoding apparatus 200 may select, based on the usable mode information, the usable modes from among the plurality of modes related to the prediction direction included in the intra prediction. The image decoding apparatus 200 may determine a weight for each of the usable modes.

The image decoding apparatus 200 may select, based on the usable mode information, usable modes from among a plurality of modes included in the inter prediction. For example, the image decoding apparatus 200 may select the usable modes from among the plurality of modes corresponding to the plurality of reference blocks to be referred to by the current block. The image decoding apparatus 200 may select the usable modes from among the plurality of modes related to the uni-directional prediction candidate or the bidirectional prediction candidate included in the inter prediction. The image decoding apparatus 200 may determine a weight for each of the usable modes.

The intra prediction may have the planar mode, the DC mode, and the plurality of modes associated with a direction. The plurality of modes associated with a direction may include 33 modes. An index for the planar mode may be '0', and an index for the DC mode may be '1'. Indexes for the plurality of modes associated with a direction may be 2 through 34, respectively. The image decoding apparatus 200 may receive the usable mode information from the bitstream.

According to an embodiment of the present disclosure, the usable mode information may indicate an interval. When the usable mode information indicates 'interval of 2', the image decoding apparatus 200 may select the planar mode ('0'), the DC mode ('1'), and 2, 4, 6, 8, 10, 12, 14, 16, 18, 20, 22, 24, 26, 28, 30, 32, and 34 as the usable modes. When the usable mode information indicates 'interval of 4', the image decoding apparatus 200 may select the planar mode, the DC mode, and 2, 6, 10, 14, 18, 22, 26, 30, and 34 as the usable modes. When the usable mode information indicates 'interval of 8', the image decoding apparatus 200 may select the planar mode, the DC mode, and 2, 10, 18, 26, and 34 as the usable modes.

According to another embodiment of the present disclosure, the usable mode information may indicate the number of modes. The image decoding apparatus 200 may sequentially select front modes from a list shown in Table 1. The list shown in Table 1 may be in an order according to frequently-used modes and then not frequently-used modes. In the list shown in Table 1, modes in brackets have the same priority, thus, the image decoding apparatus 200 may randomly select a mode. Alternatively, the image decoding apparatus 200 may receive additional information from the bitstream, thereby selecting some of the modes having the same priority.

TABLE 1

(Planar, DC), (10, 26), (34, 2), 18, (6, 14, 22, 30), (4, 8, 12, 16, 20, 24, 28, 32), (3, 5, 7, 9, 11, 13, 15, 17, 19, 21, 23, 25, 27, 29, 31, 33)

For example, when the usable mode information indicates '10', the image decoding apparatus 200 may select 10 modes as the usable modes. That is, the image decoding apparatus 200 may select the planar mode, the DC mode, and 10, 26, 34, 2, 18, 6, 14, and 22 as the usable modes. In this regard, since (6, 14, 22, 30) have the same priority, the image decoding apparatus 200 may randomly exclude '30'. Alternatively, the image decoding apparatus 200 may parse additional information from the bitstream, thereby excluding '14'. In this case, the image decoding apparatus 200 may select the planar mode, the DC mode, and 10, 26, 34, 2, 18, 6, 22, and 30 as the usable modes.

The image decoding apparatus 200 may determine a weight for each of the selected usable modes. The image decoding apparatus 200 may perform the combination prediction based on the determined weight.

When the image decoding apparatus 200 and the image encoding apparatus 400 limit the usable modes as described above, information to be transmitted in a bitstream is decreased so that transmission efficiency is improved. This will be additionally described with reference to FIG. 8.

The image decoding apparatus 200 may perform the combination prediction according to Equation (3).

$$\text{Combination prediction value} = \{(a1*X1)+(a2*X2)+ \ldots +(aN*XN)\}+\{(b1*Y1)+(b2*Y2)+ \ldots +(bM*YM)\} \quad (3)$$

In this regard, N indicates the number of usable modes of the inter prediction. M indicates the number of usable modes of the intra prediction. aN indicates weights according to an inter prediction mode. XN indicates prediction values according to the inter prediction mode. bM indicates weights according to an intra prediction mode. YM indicates prediction values according to the intra prediction mode.

The image decoding apparatus 200 may perform the combination prediction based on the weight for the inter prediction, the weight for the intra prediction, the first prediction value obtained by performing the inter prediction, and the second prediction value obtained by performing the intra prediction. For example, the combination prediction may be performed according to Equations (1) through (3) described above.

FIG. 2 illustrates a block diagram of an image decoding apparatus, according to an embodiment of the present disclosure.

The image decoding apparatus 200 according to an embodiment includes a receiver 210 and a decoder 220. What is already described for the image decoding method with reference to FIG. 1 is omitted in describing the image decoding apparatus 200.

The receiver 210 parses, from a bitstream, combination prediction information indicating whether to predict a current block by combining intra prediction and inter prediction.

The decoder 220 determines whether to perform a combination prediction on the current block, based on the combination prediction information. When the combination prediction is performed, the decoder 220 obtains a first prediction value by performing inter prediction on the current block, and obtains a second prediction value by performing intra prediction on the current block. In addition, the decoder 220 determines a weight for the inter prediction and a weight for the intra prediction, based on at least one of a distance between a reference picture and a current picture, a size of the current block, and characteristics of the inter prediction and intra prediction. In addition, the decoder 220 performs the combination prediction, based on the weight for the inter prediction, the weight for the intra prediction, the first prediction value, and the second prediction value.

FIG. 3 illustrates a flowchart of an image encoding method, according to an embodiment of the present disclosure.

The image encoding method may be performed by the image encoding apparatus 400. The image encoding apparatus 400 may perform obtaining a first prediction value by performing inter prediction on the current block (operation 310). The image encoding apparatus 400 may perform obtaining a second prediction value by performing intra prediction on the current block (operation 320). The image encoding apparatus 400 may perform determining a weight for the inter prediction and a weight for the intra prediction, based on at least one of a distance between a reference picture and a current picture, a size of the current block, and characteristics of the inter prediction and intra prediction (operation 330). The image encoding apparatus 400 may perform a combination prediction, based on the weight for the inter prediction, the weight for the intra prediction, the first prediction value, and the second prediction value (operation 340). The image encoding apparatus 400 may perform determining combination prediction information regarding whether to perform the combination prediction on the current block (operation 350). The image encoding apparatus 400 may perform transmitting a bitstream including at least one of the combination prediction information and weight information using a weight (operation 360).

The determining of the weight (operation 330) may include determining the weight based on a sample value of an original pixel in the current block, the first prediction value, and the second prediction value. That is, the image encoding apparatus 400 may compare the first and second prediction values for the current block with the sample value of the original pixel. In addition, the image encoding apparatus 400 may increase the weight to a prediction value from among the first prediction value and the second prediction value, the prediction value being close to the sample value of the original pixel. The combination prediction may be performed based on the first prediction value and the second prediction value.

For example, the determining of the weight (operation 330) may include calculating a weight based on an expected value of a ratio of the sample value of the original pixel to the first prediction value and an expected value of a ratio of the sample value of the original pixel to the second prediction value. This is expressed by Equation (4) below.

$$w1(i,j)=f(E\{x(i,j)/x1(i,j)\},E\{x(i,j)/x2(i,j)\}) \quad (4)$$

In this regard, w1 indicates the weight for the intra prediction. i indicates an X coordinate of a pixel. j indicates an Y coordinate of the pixel. f( ) indicates a predetermined function. E( ) refers to an expected value. x indicates the sample value of the original pixel. x1 indicates the second prediction value obtained by performing the intra prediction. x2 indicates the first prediction value obtained by performing the inter prediction. In addition, w2 indicating the weight for the inter prediction may be expressed by Equation (5) below.

$$w2(i,j)=1-w1(i,j) \quad (5)$$

For example, $E(x(i,j)/x1(i,j))$ indicates an expected value of $x(i,j)/x1(i,j)$. The current block may include a plurality of pixels. The image encoding apparatus 400 may calculate an expected value of a ratio of original sample values x of the plurality of samples to sample values (that is, a second prediction value) that are reconstructed through intra prediction with respect to the plurality of pixels. In addition, the image encoding apparatus 400 may calculate an expected value of a ratio of the original sample values x of the plurality of samples to sample values (that is, a first prediction value) that are reconstructed through inter prediction with respect to the plurality of pixels. Each of the expected values may be obtained by Equation (6) below.

$$E(x(i,j)/x1(ij,)) = \sum_{n=1}^{N} (x\_n(i,j)/x1\_n(ij,))/N$$

$$E(x(i,j)/x2(ij,)) = \sum_{n=1}^{N} (x\_n(i,j)/x2\_n(ij,))/N \quad (6)$$

In this regard, x_n(i,j) indicates a sample value of an original pixel of an $n^{th}$ block from among recent N blocks each having a same size as the current block. In addition, i indicates a coordinate value of an x axis. j indicates a coordinate value of an y axis. Thus, x_n(i,j) means a sample value of an original pixel at a location of (i,j) in the $n^{th}$ block. x1_n(i,j) means a second prediction value reconstructed through the intra prediction with respect to x_n(i,j). x2_n(i,j) means a first prediction value reconstructed through the inter prediction with respect to x_n(i,j).

In Equation (4), f( ) indicates a predetermined function. For example, f(X,Y) may correspond to $X^2/(X^2+Y^2)$. Thus, Equation (4) may be the same as Equation (7) below.

$$w1(i,j)=E^2\{x(i,j)/x1(i,j)\}/(E^2\{x(i,j)/x1(i,j)\}+E^2\{x(i,j)/x2(i,j)\}) \quad (7)$$

The image encoding apparatus 400 may perform the combination prediction (operation 340). In addition, the image encoding apparatus 400 may compare a result of the combination prediction, a result of the inter prediction, and a result of the intra prediction, thereby determining (operation 350) the image decoding apparatus 200 whether to perform the combination prediction. For example, the image encoding apparatus 400 may determine whether to perform the combination prediction based on bit efficiency (operation 350). The image encoding apparatus 400 may compare the number of bits used when the combination prediction is performed with the number of bits used when the intra prediction or the inter prediction is performed. The image encoding apparatus 400 may determine the combination prediction information based on a result of the comparison (operation 350). For example, when the number of bits used in the combination prediction is smaller in a same image, the image encoding apparatus 400 may set the combination prediction information as '1'. The image decoding apparatus 200 may perform the combination prediction based on the combination prediction information.

The image encoding apparatus 400 may compare a difference between an image reconstructed by performing the combination prediction thereto with an original image. The image encoding apparatus 400 may compare a difference between an image reconstructed by performing the intra prediction or the inter prediction thereto with the original image. The image encoding apparatus 400 may determine the combination prediction information based on a result of the comparison (operation 350). The image decoding apparatus 200 may receive the combination prediction information. In addition, the image decoding apparatus 200 may perform one of the combination prediction, the inter prediction, and the intra prediction on the current block, based on the combination prediction information.

The image encoding apparatus 400 may determine, by the combination prediction information, whether to perform the combination prediction. The combination prediction information may be a flag. For example, when the combination prediction information indicates '1', the combination prediction information may indicate that the combination prediction is to be performed. When the combination prediction information indicates '0', the combination prediction information may indicate that the combination prediction is not to be performed.

The image encoding apparatus 400 may obtain weight information by using a weight for the inter prediction or a weight for the intra prediction. When the weight for the inter prediction is determined, the weight for the intra prediction may be determined according to Equation (5). The weight information may include weights for all pixels in the current block. Alternatively, the weight information may include a weight for each of a plurality of regions split from the current block. In addition, the weight information may include weights that are different according to blocks included in one image. In addition, the weight information may include weights that are different according to slices included in one image. In addition, the weight information may include weights that are different according to images.

The image encoding apparatus 400 may obtain weight information by using the weight for the inter prediction and the weight for the intra prediction. For example, the image encoding apparatus 400 may determine a reference weight based on the determined weight for the inter prediction or the determined weight for the intra prediction. In addition, the image encoding apparatus 400 may include the reference weight, as the weight information, in the bitstream, and may transmit the bitstream to the image decoding apparatus 200. The image decoding apparatus 200 may determine a weight for each pixel, based on at least one of the reference weight, the distance between the reference picture and the current picture, the size of the current block, and the characteristics of the inter prediction and intra prediction.

For example, the image encoding apparatus 400 may determine a reference weight for the inter prediction to be 0.4 (reference weight). The image encoding apparatus 400 may transmit the reference weight as weight information to the image decoding apparatus 200. The image decoding apparatus 200 may set the reference weight for the inter prediction to be 0.4, based on the weight information, and may set a reference weight for the intra prediction to be 0.6. When the distance between the reference picture and the current picture is decreased with respect to a reference distance by a predetermined distance, the image decoding apparatus 200 may increase the weight for the inter prediction by 0.1 and may decrease the weight for the intra prediction by 0.1.

The fact that the image decoding apparatus 200 changes the weight based on the size of the current block and the characteristics of the inter prediction and intra prediction is already described above, thus, detailed descriptions thereof are omitted here.

The image encoding apparatus 400 may transmit the bitstream including at least one of the combination prediction information and the weight information (operation 360). The image encoding apparatus 400 may include only the combination prediction information in the bitstream and may transmit the bitstream (operation 360). For example, the image encoding apparatus 400 may include only the combination prediction information in the bitstream and may transmit the bitstream to the image decoding apparatus 200. The image decoding apparatus 200 may parse the combination prediction information and may determine to perform the combination prediction. Even if the image decoding apparatus 200 did not receive the weight information, the image decoding apparatus 200 may set the predetermined reference weight, and may determine a weight for each pixel, based on at least one of the distance between the reference picture and the current picture, the size of the current block, and the characteristics of the inter prediction and intra prediction. The method of setting a weight is described above, thus, detailed descriptions thereof are omitted here.

The image encoding apparatus 400 may include only the weight information in the bitstream and may transmit the bitstream (operation 360). When the image decoding apparatus 200 receives the weight information, the image decoding apparatus 200 may determine whether to perform the combination prediction. Based on the weight information, the weights for the inter prediction and the intra prediction with respect to the current block may be obtained.

The image encoding apparatus 400 may perform entropy coding on at least one of the combination prediction information and the weight information with a lower priority than the results of the intra prediction and the inter prediction. For example, the image encoding apparatus 400 may perform entropy coding on information related to the combination prediction with a lower priority than information related to the inter prediction and the intra prediction. In addition, the image encoding apparatus 400 may include, in the bitstream, the information related to the combination prediction by using more bits than the information related to the inter prediction and the intra prediction. When the information related to the combination prediction is entropy-coded with the lower priority, a higher priority may be applied to the inter prediction and the intra prediction. In addition, when the information related to the combination prediction is entropy-coded with the lower priority, the image encoding apparatus 400 and the image decoding apparatus 200 according to the present disclosure may be compatible with an existing codec.

A program for executing the image decoding method described with reference to FIG. 1 and the image encoding method described with reference to FIG. 3 may be recorded to a non-transitory computer-readable recording medium.

Figure 4:
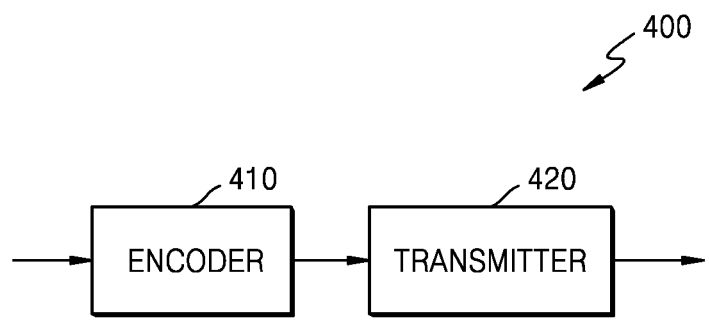
FIG. 4 illustrates a block diagram of an image encoding apparatus, according to an embodiment of the present disclosure.

FIG. 4 illustrates a block diagram of an image encoding apparatus, according to an embodiment of the present disclosure.

The image encoding apparatus 400 according to an embodiment includes an encoder 410 and a transmitter 420. What is already described for the image encoding method with reference to FIG. 3 is omitted in describing the image encoding apparatus 400.

The encoder 410 obtains a first prediction value by performing inter prediction on a current block. The encoder 410 may obtain a second prediction value by performing intra prediction on the current block. The encoder 410 may determine a weight for the inter prediction and a weight for the intra prediction, based on at least one of a distance between a reference picture and a current picture, a size of the current block, and characteristics of the inter prediction and intra prediction. The encoder 410 may perform a combination prediction, based on the weight for the inter prediction, the weight for the intra prediction, the first prediction value, and the second prediction value. The encoder 410 may determine combination prediction information about whether to perform the combination prediction on the current block.

The transmitter 420 may transmit a bitstream including at least one of the combination prediction information and weight information using a weight.

Figure 5:
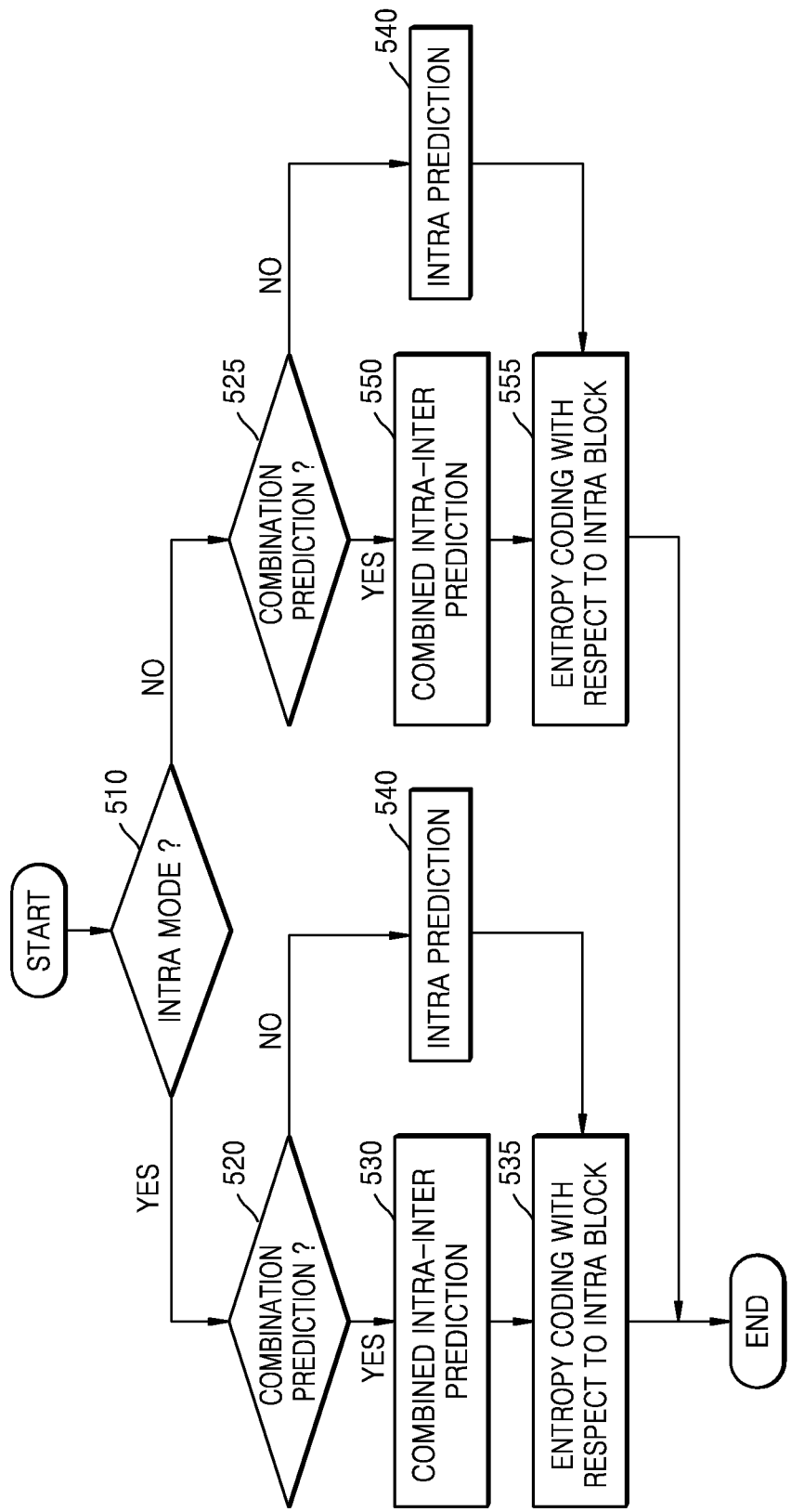
FIG. 5 illustrates a flowchart of an image encoding method, according to an embodiment of the present disclosure.

FIG. 5 illustrates a flowchart of an image encoding method, according to an embodiment of the present disclosure.

FIG. 5 illustrates another embodiment of the image encoding method described with reference to FIG. 3. The image encoding apparatus 400 may determine whether to perform an intra mode (operation 510). The image encoding apparatus 400 may determine whether to perform the intra mode (operation 510) so as to sequentially perform the intra mode and an inter mode. When the intra mode and the inter mode may be processed in parallel, whether to perform the intra mode may not be determined (operation 510).

When the image encoding apparatus 400 determines to perform the intra mode, the image encoding apparatus 400 may determine whether to perform a combination prediction (operation 520). When the combination prediction is performed, the image encoding apparatus 400 may perform a combined intra-inter prediction (operation 530). The performing of the combined intra-inter prediction (operation 530) may include operations 310 through 350 of FIG. 3. When the combination prediction is not performed, the image encoding apparatus 400 may perform intra prediction (operation 540). The image encoding apparatus 400 may perform the combined intra-inter prediction or the intra prediction, thereby obtaining at least one of combination prediction information and weight information.

The image encoding apparatus 400 may perform entropy coding on a result of the combined intra-inter prediction or the intra prediction (operation 535). Since the image encoding apparatus 400 determined to perform the intra mode, the image encoding apparatus 400 may perform entropy coding on an intra block (operation 535). For example, the image encoding apparatus 400 may perform entropy coding on at least one of the combination prediction information and the weight information. The performing of the entropy coding may be included in operation 360 of FIG. 3. The entropy coding on the intra block and entropy coding on an inter block may be different from each other in a quantization level of a transformation coefficient or a post-processing filter.

When the image encoding apparatus 400 determines not to perform the intra mode, the image encoding apparatus 400 may determine whether to perform the combination prediction (operation 525). When the combination prediction is performed, the image encoding apparatus 400 may perform the combined intra-inter prediction (operation 550). The performing of the combined intra-inter prediction (operation 550) may include operations 310 through 350 of FIG. 3. The performing of the combined intra-inter prediction (operation 530) and the performing of the combined intra-inter prediction (operation 550) include differently performing entropy coding. For example, the performing of the combined intra-inter prediction (operation 530) includes performing entropy coding on the intra block (operation 535). However, the performing of the combined intra-inter prediction (operation 550) includes performing entropy coding on the inter block (operation 555).

When the combination prediction is not performed, the image encoding apparatus 400 may perform inter prediction (operation 560). The image encoding apparatus 400 may perform the combined intra-inter prediction or the inter prediction, thereby obtaining at least one of the combination prediction information and the weight information.

The image encoding apparatus 400 may perform entropy coding on a result of the combined intra-inter prediction or a result of the inter prediction (operation 555). Since the image encoding apparatus 400 determined to perform the inter mode, the image encoding apparatus 400 may perform entropy coding on the inter block (operation 555). For example, the image encoding apparatus 400 may perform entropy coding on at least one of the combination prediction information and the weight information. The performing of the entropy coding (operation 555) may be included in operation 360 of FIG. 3. The entropy coding on the intra block and entropy coding on the inter block may be different from each other in a quantization level of a transformation coefficient or a post-processing filter. In addition, as described above, when entropy coding is performed, the information related to the combination prediction may have a lower priority than information related to non-combination prediction.

The image encoding apparatus 400 may select the most effective encoding method based on the performing of the combined intra-inter prediction (operations 530 and 550), the performing of the intra prediction (operation 540), and the performing of the inter prediction (operation 560). The image encoding apparatus 400 may select the most effective encoding method by taking into account the entropy coding on the intra block (operation 535) and the entropy coding on the inter block (operation 555). A selected result may be included in the bitstream and may be transmitted to the image decoding apparatus 200.

As described with reference to FIG. 1, the current block may include at least one of a coding unit, a prediction unit, and a transformation unit. The current block may include a prediction unit used in the inter prediction, and a prediction unit used in the intra prediction. The image encoding apparatus 400 may perform encoding on various prediction units. In addition, the image encoding apparatus 400 may select the most efficient prediction unit from among the various prediction units. The image encoding apparatus 400 may independently determine the prediction unit used in the inter prediction from the prediction unit used in the intra prediction. For example, the image encoding apparatus 400 may split the prediction unit used in the inter prediction from the coding unit in a most efficient manner for the inter prediction. When the image encoding apparatus 400 determines the prediction unit used in the inter prediction, the image encoding apparatus 400 may not consider the prediction unit used in the intra prediction.

The flowchart of FIG. 5 is an embodiment of the present disclosure, and thus the present disclosure is not limited thereto. For example, in FIG. 5, the performing of the combined intra-inter prediction is performed twice (operations 530 and 550). In order to avoid such redundancy, the image encoding apparatus 400 may not perform the combined intra-inter prediction (operation 550) but may use a result of performing the combined intra-inter prediction (operation 530). Since the performing of the combined intra-inter prediction (operations 530 and 550) includes intra prediction or inter prediction, the image encoding apparatus 400 may obtain a result of the performing of the inter prediction (operation 540) or a result of the performing of the intra prediction (operation 530), based on results of the performing of the combined intra-inter prediction (operations 530 and 550). If parallel processing is available as described above, at least one of the determining of whether to perform the intra mode (operation 510) and the determining of whether to perform the combination prediction (operations 520 and 525) may not be performed. For example, the image encoding apparatus 400 may simultaneously perform the combined intra-inter prediction, the intra prediction, and the inter prediction.

Figure 6:
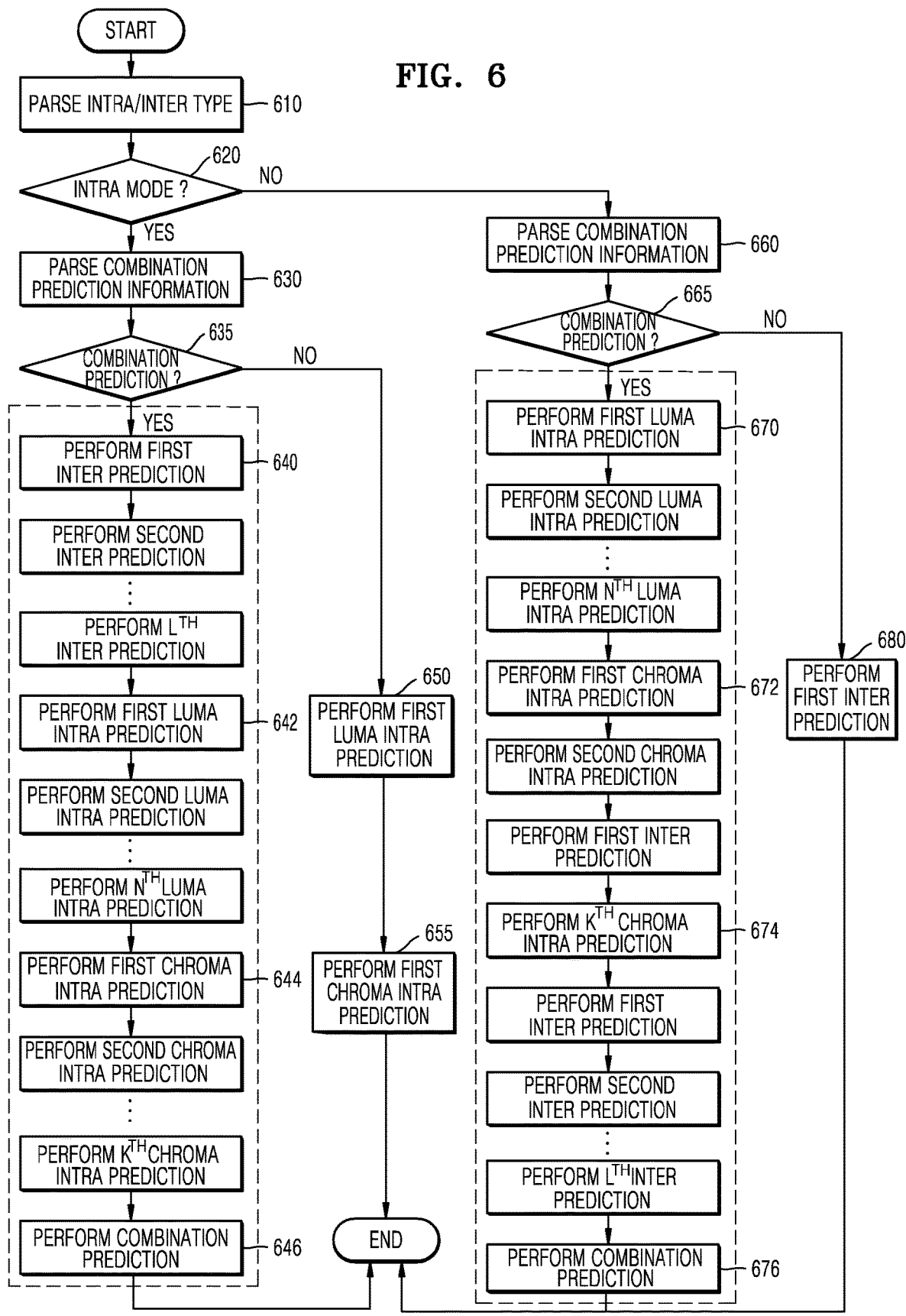
FIG. 6 illustrates a flowchart of an image decoding method, according to an embodiment of the present disclosure.

FIG. 6 illustrates a flowchart of an image decoding method, according to an embodiment of the present disclosure.

The image decoding apparatus 200 may parse an intra/inter type from a received bitstream (operation 610). The image decoding apparatus 200 may determine whether it is an intra mode, based on the intra/inter type (operation 620). When it is determined as the intra mode, the image decoding apparatus 200 may parse combination prediction information (operation 630). The parsing of the combination prediction information (operation 630) may correspond to operation 110 of FIG. 1. The image decoding apparatus 200 may determine whether to perform a combination prediction, based on the combination prediction information (operation 635). The determining of whether to perform the combination prediction (operation 635) may correspond to operation 120 of FIG. 1.

When the combination prediction is performed, the image decoding apparatus 200 may perform a plurality of inter predictions. For example, first inter prediction (operation 640) through $L^{th}$ inter prediction may be performed. Since the plurality of inter predictions are described with reference to FIG. 1, detailed descriptions thereof are omitted here. The image decoding apparatus 200 may perform a plurality of intra predictions. For example, first luma intra prediction (operation 642) through $N^{th}$ luma intra prediction may be performed. In addition, first chroma intra prediction (operation 644) through $K^{th}$ chroma intra prediction may be performed. The performing of the inter prediction and the performing of the intra prediction may correspond to operation 130 of FIG. 1. Since the plurality of intra predictions are particularly described with reference to FIG. 1, detailed descriptions thereof are omitted here.

When the combination prediction is performed, the image decoding apparatus 200 may perform the combination prediction on a luminance channel. The image decoding apparatus 200 may perform one of the inter prediction and the intra prediction on a chrominance channel. That is, the image decoding apparatus 200 may perform the combination prediction only on the luminance channel, and may perform one of the inter prediction and the intra prediction on the chrominance channel. For example, the image decoding apparatus 200 may determine whether to perform the combination prediction on the chrominance channel, based on chrominance combination prediction information parsed from a bitstream. In addition, the image decoding apparatus 200 may not perform the combination prediction on the chrominance channel, based on chrominance combination prediction.

When the combination prediction is performed only on the luminance channel, the image decoding apparatus 200 receives only a weight for the luminance channel from the image encoding apparatus 400, thus, transmission efficiency of the bitstream may be increased.

When the combination prediction is performed, the image decoding apparatus 200 may set different weights for the luminance channel and the chrominance channel. In this case, the image decoding apparatus 200 may provide a high-quality reconstructed image for the luminance channel and the chrominance channel. On the contrary, the image decoding apparatus 200 may receive one set of weights from the image encoding apparatus 400 and may use them as weights for the luminance channel and the chrominance channel. The image decoding apparatus 200 may receive weight information, and the weight information may include a flag about whether to apply different weights to the luminance channel and the chrominance channel.

The image decoding apparatus 200 may perform the combination prediction based on the plurality of intra predictions and inter predictions (operation 646). The performing of the combination prediction (operation 646) may include operations 140 and 150 of FIG. 1.

When the combination prediction is not performed, the image decoding apparatus 200 may perform the intra prediction. For example, the image decoding apparatus 200 may perform first luma intra prediction (operation 650) and first chroma intra prediction (operation 655).

When the inter mode is determined, the image decoding apparatus 200 may parse combination prediction information (operation 660). The parsing of the combination prediction information (operation 660) may correspond to operation 110 of FIG. 1. The image decoding apparatus 200 may determine whether to perform the combination prediction, based on the combination prediction information (operation 665). The determining of whether to perform the combination prediction (operation 665) may correspond to operation 120 of FIG. 1.

When the combination prediction is performed, the image decoding apparatus 200 may perform the plurality of intra predictions. For example, first luma intra prediction (operation 670) through $N^{th}$ luma intra prediction may be performed. In addition, first chroma intra prediction (operation 672) through $K^{th}$ chroma intra prediction may be performed. Since the plurality of intra predictions are particularly described with reference to FIG. 1, detailed descriptions thereof are omitted here. The image decoding apparatus 200 may perform a plurality of inter predictions. For example, first inter prediction (operation 674) through $L^{th}$ inter prediction may be performed. Since the plurality of inter predictions are described with reference to FIG. 1, detailed descriptions thereof are omitted here. The performing of the inter prediction and the performing of the intra prediction may correspond to operation 130 of FIG. 1.

The image decoding apparatus 200 may perform the combination prediction based on the plurality of intra predictions and inter predictions (operation 676). The performing of the combination predictions (operation 676) may include operations 140 and 150 of FIG. 1.

When the combination prediction is not performed, the image decoding apparatus 200 may perform the inter prediction. For example, the image decoding apparatus 200 may perform the first inter prediction (operation 680) and the first chroma intra prediction (operation 655).

The current block may include a prediction unit used in the inter prediction and a prediction unit used in the intra prediction. The image decoding apparatus 200 may determine the prediction unit based on the bitstream. The image decoding apparatus 200 may independently determine the prediction unit used in the inter prediction from the prediction unit used in the intra prediction. For example, the image decoding apparatus 200 may parse, from the bitstream, each of information about the prediction unit used in the inter prediction and information about the prediction unit used in the intra prediction. When the image decoding apparatus 200 determines the prediction unit used in the inter prediction, the image decoding apparatus 200 may not consider the prediction unit used in the intra prediction.

When the combination prediction is performed, both the inter prediction and the intra prediction may be performed. In this regard, when the inter prediction is performed, the image decoding apparatus 200 may use the prediction unit used in the inter prediction, and when the intra prediction is performed, the image decoding apparatus 200 may use the prediction unit used in the intra prediction. The image decoding apparatus 200 may use a separate prediction unit for the combination prediction.

Figure 7:
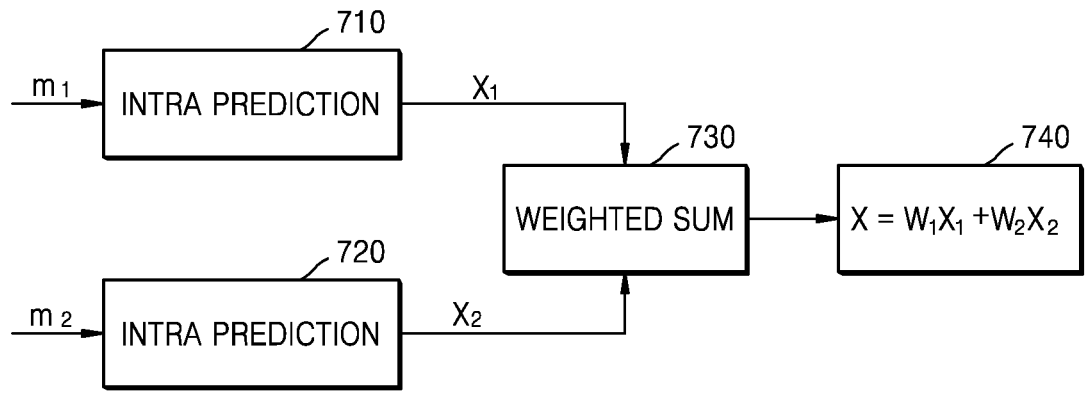
FIG. 7 illustrates a flowchart of combination prediction, according to an embodiment of the present disclosure.

FIG. 7 illustrates a flowchart of combination prediction, according to an embodiment of the present disclosure.

As described with reference to FIG. 1, a combination prediction value may be calculated by using Equation (1). For example, the image decoding apparatus 200 may perform intra prediction based on intra prediction information m1 (operation 710). The intra prediction information m1 may include information about a prediction direction. The image decoding apparatus 200 may perform the intra prediction (operation 710), thereby obtaining a second prediction value X1.

In addition, the image decoding apparatus 200 may perform inter prediction based on inter prediction information m2 (operation 720). The inter prediction information may include a motion vector. The image decoding apparatus 200 may perform the inter prediction (operation 720), thereby obtaining a first prediction value X2. The image decoding apparatus 200 may calculate a weighted sum 730 based on a weight W2 for the inter prediction, a weight W1 for the intra prediction, the first prediction value, and the second prediction value. A result 740 of the weighted sum may be equal to a result of Equation (1).

The weight may be determined based on at least one of a location of a pixel included in a current block and a temporal distance between a current picture including the current block and a reference picture including a reference block. Thus, when Equation (1) is further particularly described, it may become equal to Equation (8).

$$x(i,j)=w(i,j)a(t)x1(i,j)+(1-w(i,j))b(t)x2(i,j) \quad (8)$$

In this regard, i indicates an X coordinate of a pixel. j indicates an Y coordinate of the pixel. x indicates a combination prediction value. x1 indicates a second prediction value obtained by performing the intra prediction. x2 indicates a first prediction value obtained by performing the inter prediction. w indicates a weight for an intra prediction value. w indicates a function in which i and j are variables. Thus, a value of w may vary according to a location of the pixel. In addition, a and b indicate a function about the temporal distance between the current picture and the reference picture. a indicates one of weights for the intra prediction. a(t) may have a polynomial. For example, a(t) may be expressed as a quadratic function of c*^2+d*t+e. As described above, when the distance between the reference picture and the current picture is increased (when t is increased), the weight for the intra prediction may be increased. That is, a(t) may be a monotonically increasing function. In addition, a(t) may have a value between 0 and 1. b(t) may correspond to 1−a(t).

When the number of reference pictures is N, the image encoding apparatus 400 or the image decoding apparatus 200 may calculate ak(tk) (where k=1, 2, . . . , N). In addition, the image decoding apparatus 200 or the image encoding apparatus 400 may calculate a(t) of Equation (8) by using ak(tk). For example, a(t) may be expressed by Equation (9) below.

$$a(t)=\{a1(t1)+a2(t2)+ \ldots +aN(tN)\}/\{a1(t1)+a2(t2)+ \ldots +aN(tN)+1\} \quad (9)$$

In addition, b(t) of Equation (8) may be expressed by Equation (10) below.

$$b(t)=1/\{a1(t1)+a2(t2)+ \ldots +aN(tN)+1\} \quad (10)$$

Figure 8:
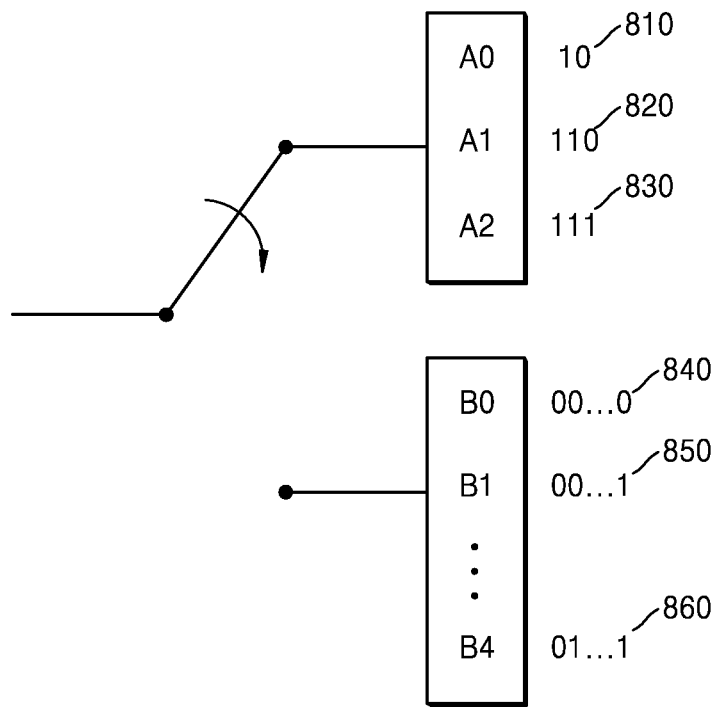
FIG. 8 illustrates a method of encoding a usable mode in a prediction, according to an embodiment of the present disclosure.

FIG. 8 illustrates a method of encoding a usable mode in a prediction, according to an embodiment of the present disclosure.

The image encoding apparatus 400 may use variable-length coding and fixed-length coding so as to decrease an amount of data to be transmitted to the image decoding apparatus 200. The image encoding apparatus 400 may use a statistical characteristic of an image and an intra prediction mode so as to express thirty five intra prediction modes by using smaller bits. In general, when a natural image is split into blocks each having a constant size, a block and its adjacent blocks have a similar image characteristic. Thus, an intra prediction mode for a current block is likely to be equal or similar to that of the adjacent blocks. In consideration of this characteristic, the image encoding apparatus 400 may encode a mode of the current block based on intra prediction modes of a left block and an above block of the current block.

Referring to FIG. 8, the image encoding apparatus 400 may perform the variable-length coding. For example, the image encoding apparatus 400 may allocate the intra prediction mode of the left block to A0 according to a Most Probable Mode (MPM). The image encoding apparatus 400 may allocate the intra prediction mode of the above block to A1. The image encoding apparatus 400 may allocate one of a planar mode, a DC mode, and a vertical mode to A2. Due to the variable-length coding, A0 through A2 may have different number of bits. The image encoding apparatus 400 may encode an A0 mode to '10'. The encoding apparatus 400 may encode an A1 mode to '110'. The encoding apparatus 400 may encode an A2 mode to '111'.

As described above, the intra prediction mode for the current block may be similar to prediction modes of adjacent blocks. That is, when the intra prediction is performed on the current block, there is a high probability that a prediction mode similar to the prediction modes of the adjacent blocks occurs. Thus, the encoding apparatus 400 may allocate a small number of bits to the prediction mode, thereby enhancing transmission efficiency of a bitstream.

The image encoding apparatus 400 may perform fixed-length coding on other modes that are not allocated as a variable-length coding mode. For example, the image encoding apparatus 400 may encode a B0 mode to '00 . . . 00'. Equally, the image encoding apparatus 400 may encode a BN−1 mode to '01 . . . 11'. The image decoding apparatus 200 may check a first bit of an encoded bit string, thereby recognizing whether the variable-length coding was used or the fixed-length coding was performed. For example, a first bit of the A0 through A2 modes is '1', and a first bit of the B0 through BN−1 modes is '0'. When a first bit is '1', the image decoding apparatus 200 may recognize that the variable-length coding was used.

As described above, the image decoding apparatus 200 may receive the usable mode information from the bitstream. For example, when the usable mode information indicates 'interval of 4', the image decoding apparatus 200 may select the planar mode, the DC mode, and 2, 6, 10, 14, 18, 22, 26, 30, and 34 as the usable modes. In this regard, the planar mode, the DC mode, and the '2' mode may be encoded by using the variable-length coding. Other 6, 10, 14, 18, 22, 26, 30 and 34 modes (eight modes) may be encoded by using the fixed-length coding. In this case, the image encoding apparatus 400 may perform the fixed-length coding on the eight modes with only three bits. When usable modes are not selected, the fixed-length coding has to be performed on thirty two modes, thus, five bits are required. Thus, by selecting the usable modes, encoding may be performed using a smaller number of bits. In addition, since the image encoding apparatus 400 transmits the smaller number of bits to the image decoding apparatus 200, efficiency may be enhanced.

FIGS. 9A-9D illustrate a method of decreasing accuracy of a motion vector in a prediction, according to an embodiment of the present disclosure.

When a size of an image is large, there may be a need to decrease accuracy of a motion vector so as to increase a data processing speed. In addition, in order to decrease a size of data to be transmitted from the image encoding apparatus 400 to the image decoding apparatus 200, there may be a need to decrease the accuracy of the motion vector.

Figure 9A:
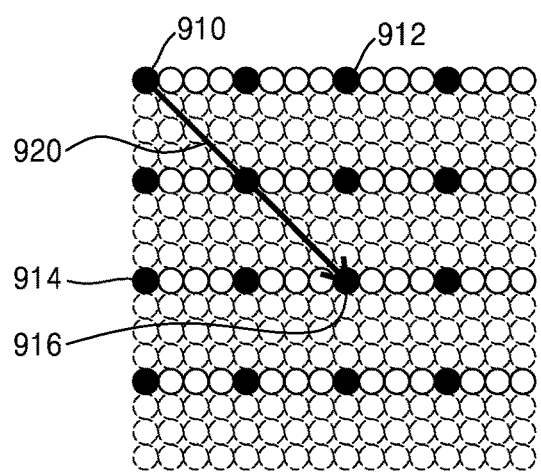
FIGS. 9A-9D illustrate a method of decreasing accuracy of a motion vector in a prediction, according to an embodiment of the present disclosure.

Referring to FIG. 9A, an image may be up-scaled. A black dot indicates an original pixel, and a white dot indicates an interpolated pixel through up-scaling. Interpolated pixels are sub-pixels. The image decoding apparatus 200 may parse motion vector accuracy information from a bitstream. In addition, the image decoding apparatus 200 may set accuracy of a motion vector in inter prediction for a current block to be one of a half-pel, an integer-pel, and a 2-pel, based on the motion vector accuracy information.

In this regard, pel refers to a pixel and a movement unit of a motion vector. For example, in FIG. 9A, the black dot indicates the original pixel. To move between original pixels means to move by one pixel, thus, this may be expressed as an integer-pel (a 1-pel).

The image decoding apparatus 200 according to an embodiment of the present disclosure may set accuracy of the motion vector to be a 2-pel, based on the motion vector accuracy information. In this case, the motion vector may be set for a pixel at an interval of a 2-pel from a search start pixel 910. The image decoding apparatus 200 may set the motion vector to be toward any one of a pixel 912, a pixel 916, and a pixel 914 from the start pixel 910. The image decoding apparatus 200 does not search for a motion vector that is more accurate than a 2-pel. In FIG. 9A, the image decoding apparatus 200 may select a motion vector 920 that is toward the pixel 916 from the pixel 910. The image decoding apparatus 200 may select the motion vector 920 based on information parsed from the bitstream.

Figure 9B:
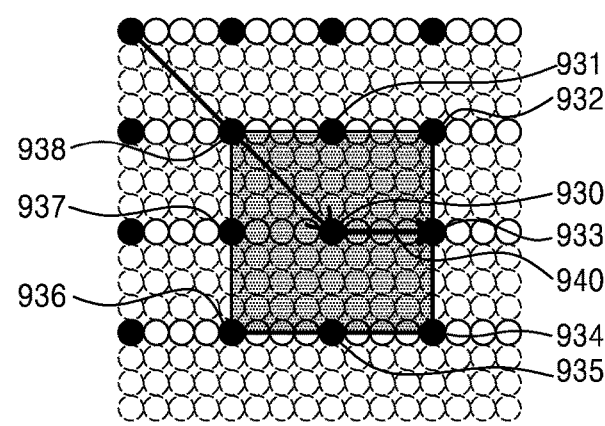

Setting of a motion vector according to another embodiment of the present disclosure is provided in FIG. 9B. The image decoding apparatus 200 may set the accuracy of the motion vector to be an integer-pel, based on the motion vector accuracy information. In this case, the image decoding apparatus 200 may select a same motion vector as in FIG. 9A and then may further perform searching described below. A motion vector may be set for a pixel at an interval of an integer-pel from a search start pixel 930. The image decoding apparatus 200 may set the motion vector to be toward any one of a pixel 931, a pixel 932, a pixel 933, a pixel 934, a pixel 935, a pixel 936, a pixel 937, and a pixel 938 from the start pixel 930. According to a search scheme, the image decoding apparatus 200 may set the motion vector to be toward any one of the pixel 931, the pixel 933, the pixel 935, and the pixel 937. The image decoding apparatus 200 may select a motion vector 940 based on the bitstream. The image decoding apparatus 200 may select the motion vector 940 toward the pixel 933 from the pixel 930.

Figure 9C:
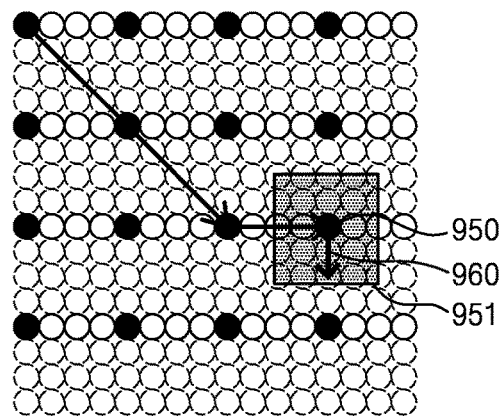

Setting of a motion vector according to another embodiment of the present disclosure is provided in FIG. 9C. The image decoding apparatus 200 may set the accuracy of the motion vector to be a half-pel, based on the motion vector accuracy information. In this case, the image decoding apparatus 200 may select a same motion vector as in FIG. 9B and then may further perform searching described below. A motion vector may be set for a pixel at an interval of a half-pel from a search start pixel 950. The image decoding apparatus 200 may select a motion vector 960 based on the bitstream. The image decoding apparatus 200 may select the motion vector 960 toward a pixel 951 from the pixel 950.

Figure 9D:
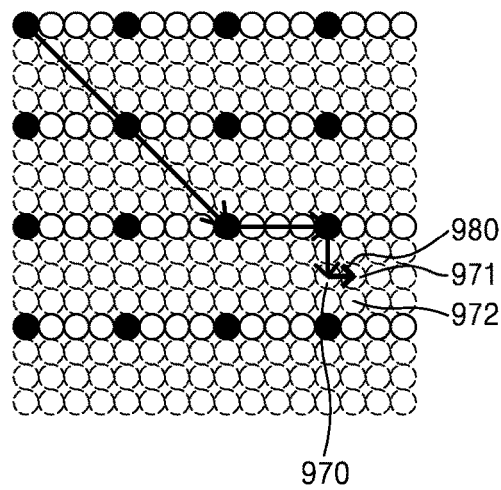

Setting of a motion vector according to another embodiment of the present disclosure is provided in FIG. 9D. The image decoding apparatus 200 may set the accuracy of the motion vector to be a quarter-pel, based on the motion vector accuracy information. In this case, the image decoding apparatus 200 may select a same motion vector as in FIG. 9C and then may further perform searching described below. A motion vector may be set for a pixel at an interval of a quarter-pel from a search start pixel 970. The image decoding apparatus 200 may select a motion vector 980 based on the bitstream. The image decoding apparatus 200 may select the motion vector 980 toward a pixel 971 from the pixel 970.

Figure 10:
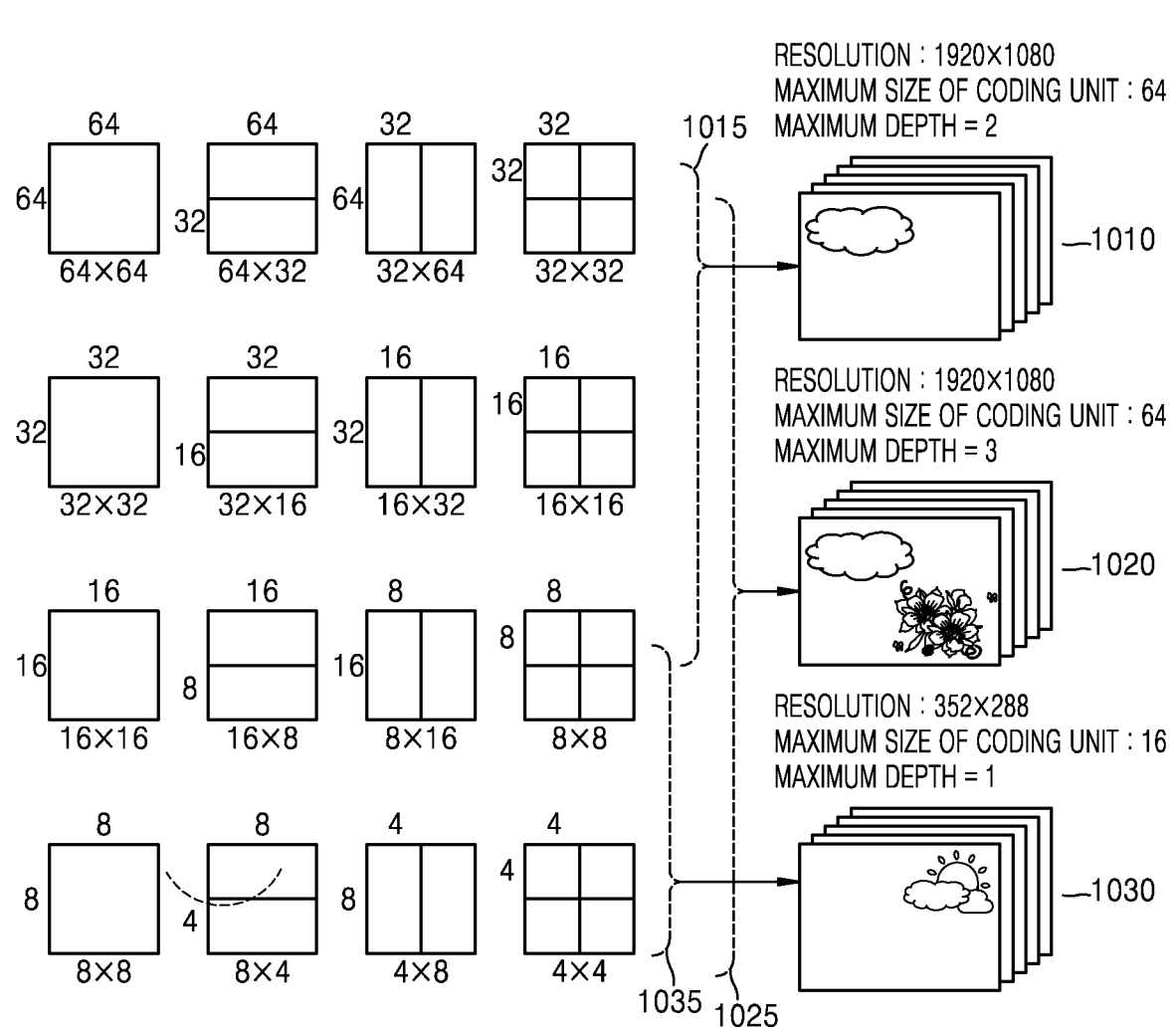
FIG. 10 illustrates a concept of coding units, according to an embodiment of the present disclosure.

FIG. 10 illustrates a concept of coding units, according to an embodiment of the present disclosure.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4. Although not illustrated in FIG. 10, a size of a coding unit may be larger than 64×64. For example, the coding unit may have a size of 128×128, 256×256, etc. When the coding unit is proportionally increased from 64×64, a size of a partition is also increased with a same ratio.

In video data 1010, a resolution is 1920×1080, a maximum size of a coding unit is 64, and a maximum depth is 2. In video data 1020, a resolution is 1920×1080, a maximum size of a coding unit is 64, and a maximum depth is 3. In video data 1030, a resolution is 352×288, a maximum size of a coding unit is 16, and a maximum depth is 1. The maximum depth shown in FIG. 10 denotes a total number of splits from a largest coding unit to a smallest coding unit.

If a resolution is high or a data amount is large, a maximum size of a coding unit may be large so as to not only increase encoding efficiency but also to accurately reflect characteristics of an image. Accordingly, the maximum size of the coding unit of the video data 1010 and 1020 having a higher resolution than the video data 1030 may be selected to 64. Alternatively, the maximum size may be selected to be a larger value.

Since the maximum depth of the video data 1010 is 2, coding units 1015 of the vide data 1010 may include a largest coding unit having a long axis size of 64, and coding units having long axis sizes of 32 and 16 since depths are deepened to two layers by splitting the largest coding unit twice. On the other hand, since the maximum depth of the video data 1030 is 1, coding units 1035 of the video data 1030 may include a largest coding unit having a long axis size of 16, and coding units having a long axis size of 8 since depths are deepened to one layer by splitting the largest coding unit once.

Since the maximum depth of the video data 1020 is 3, coding units 1025 of the video data 1020 may include a largest coding unit having a long axis size of 64, and coding units having long axis sizes of 32, 16, and 8 since the depths are deepened to 3 layers by splitting the largest coding unit three times. As a depth deepens, detailed information may be precisely expressed.

Figure 11:
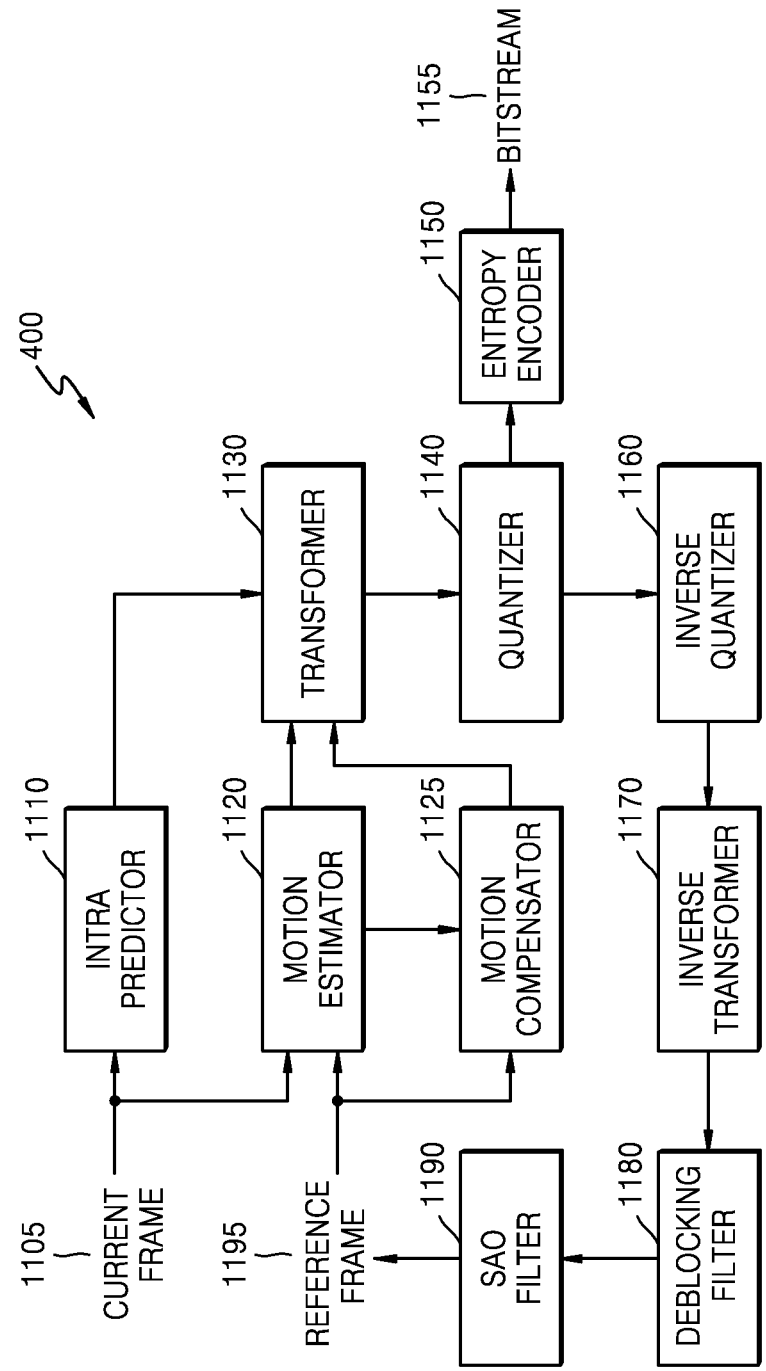
FIG. 11 illustrates a block diagram of an image encoder based on coding units, according to an embodiment of the present disclosure.

FIG. 11 illustrates a block diagram of an image encoder 1100 based on coding units, according to an embodiment of the present disclosure.

The image encoder 1100 according to an embodiment includes operations of the encoder 410 of the image encoding apparatus 400 so as to encode image data. That is, an intra predictor 1110 performs intra prediction on coding units in an intra mode, from among a current frame 1105, and a motion estimator 1120 and a motion compensator 1125 respectively perform inter estimation and motion compensation by using the current frame 1105 in an inter mode and a reference frame 1195. A combination prediction unit 1130 may perform combination prediction based on the results of the intra prediction and the inter prediction. The combination prediction performed by the combination prediction unit 1130 is described in detail with reference to FIGS. 3 through 5, thus, detailed descriptions thereof are omitted here.

Data output from the intra predictor 1110, the motion estimator 1120, and the motion compensator 1125 may be combination-predicated through the combination prediction unit 1130. Data output from the intra predictor 1110, the motion estimator 1120, the motion compensator 1125, and the combination prediction unit 1130 is output as a quantized transformation coefficient through a transformer 1130 and a quantizer 1140. The quantized transformation coefficient is reconstructed as data in the spatial domain through an inverse quantizer 1160 and an inverse transformer 1170, and the reconstructed data in the spatial domain is output as the reference frame 1195 after being post-processed through a deblocker 1180 and a loop filter 1190. The quantized transformation coefficient may be output as a bitstream 1155 through an entropy encoder 1150.

In order for the image encoder 1100 to be applied in the image encoding apparatus 400, all elements of the image encoder 1100, i.e., the intra predictor 1110, the motion estimator 1120, the motion compensator 1125, the transformer 1130, the quantizer 1140, the entropy encoder 1150, the inverse quantizer 1160, the inverse transformer 1170, the deblocker 1180, and the loop filter 1190 perform operations based on each coding unit among coding units having a tree structure while considering the maximum depth of each largest coding unit.

In particular, the intra predictor 1110, the motion estimator 1120, and the motion compensator 1125 determine partitions and a prediction mode of each coding unit from among the coding units having a tree structure while considering the maximum size and the maximum depth of a current largest coding unit, and the transformer 1130 determines the size of the transformation unit in each coding unit from among the coding units having a tree structure.

The image encoder 1100 may classify pixels according to an edge type (or a band type) of each largest coding unit of the reference frame 1195, may determine an edge direction (or a start band position), and may determine an average error value of reconstructed pixels included in each category. With respect to each largest coding unit, offset mergence information, an offset type, and offset values may be encoded and signaled.

Figure 12:
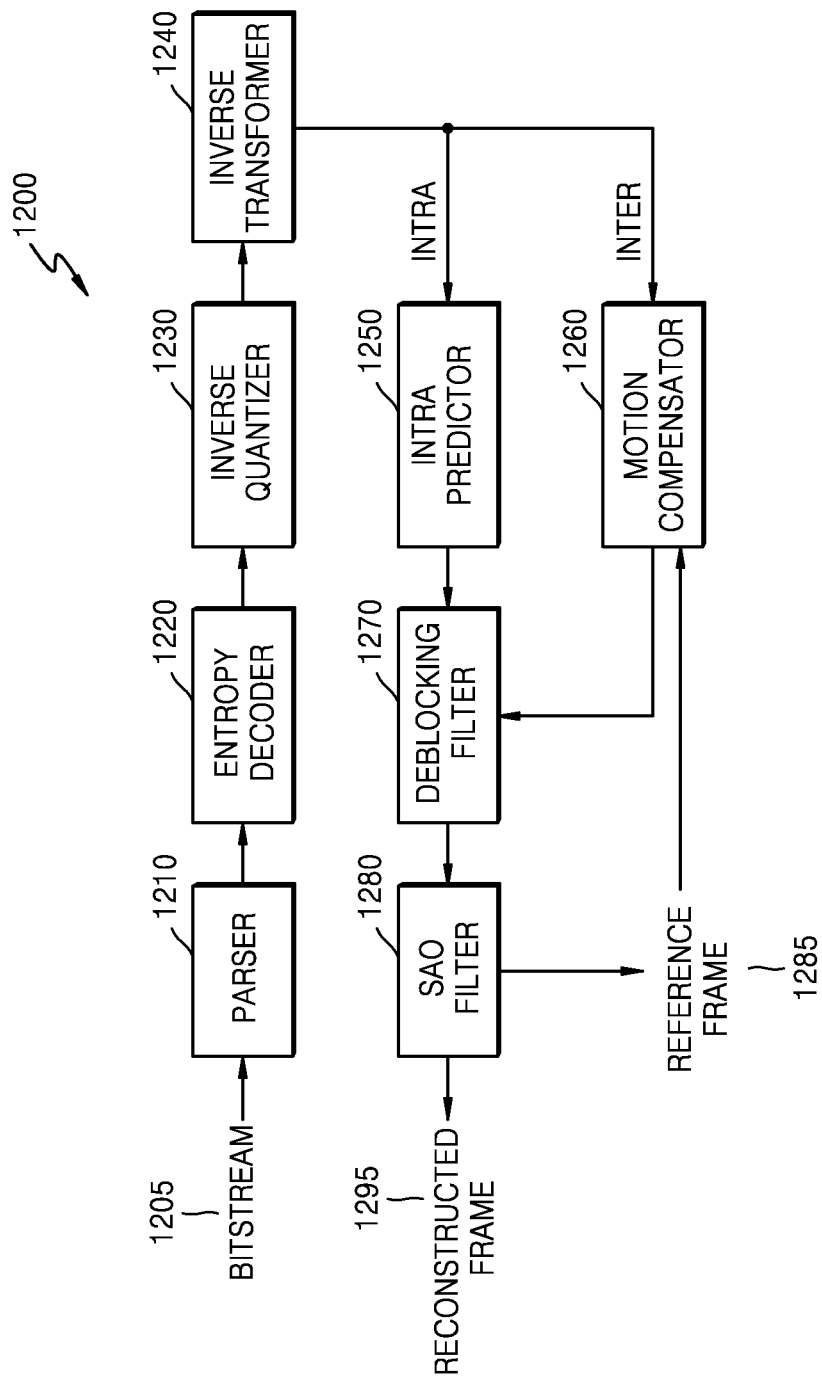
FIG. 12 illustrates a block diagram of an image decoder based on coding units, according to an embodiment of the present disclosure.

FIG. 12 illustrates a block diagram of an image decoder 1200 based on coding units, according to an embodiment of the present disclosure.

A parser 1210 parses, from a bitstream 1205, encoded image data to be decoded and information about encoding required for decoding. The encoded image data is output as inverse quantized data through an entropy decoder 1220 and an inverse quantizer 1230, and the inverse quantized data is reconstructed to image data in the spatial domain through an inverse transformer 1240.

An intra predictor 1250 performs intra prediction on coding units in an intra mode with respect to the image data in the spatial domain, and a motion compensator 1260 performs motion compensation on coding units in an inter mode by using a reference frame 1285.

The data in the spatial domain which has passed through the intra predictor 1250 and the motion compensator 1260 may be used by a combination prediction unit 1270 in the combination prediction. Referring to FIG. 12, the data in the spatial domain which has passed through the intra predictor 1250 and the motion compensator 1260 has to pass through the combination prediction unit 1270, but the present disclosure is not limited thereto. The combination prediction may not be performed based on the combination prediction information received by the image encoding apparatus 400. In this regard, the data in the spatial domain which has passed through the intra predictor 1250 and the motion compensator 1260 may be output to a deblocker 1275. The combination prediction is described in detail with reference to FIGS. 1, 2, and 6, thus, detailed descriptions thereof are omitted here.

The image data in the spatial domain, which passed through the combination prediction unit 1270, may be output as a reconstructed frame 1295 after being post-processed through the deblocker 1275 and a loop filter 1280. Also, the image data that is post-processed through the deblocker 1275 and the loop filter 1280 may be output as the reference frame 1285.

In order to decode the image data in the decoder 220 of the image decoding apparatus 200, the image decoder 1200 may perform operations that are performed after the parser 1210.

In order for the image decoder 1200 to be applied in the image decoding apparatus 200, all elements of the image decoder 1200, i.e., the parser 1210, the entropy decoder 1220, the inverse quantizer 1230, the inverse transformer 1240, the intra predictor 1250, the motion compensator 1260, the deblocker 1275, and the loop filter 1280 perform operations based on coding units having a tree structure for each largest coding unit.

In particular, the intra prediction 1250 and the motion compensator 1260 determine partitions and a prediction mode for each of the coding units having a tree structure, and the inverse transformer 1240 determines a size of a transformation unit for each coding unit.

The image decoder 1200 may extract offset parameters of largest coding units from a bitstream. Based on offset mergence information from among the offset parameters of a current largest coding unit, current offset parameters may be reconstructed by using offset parameters of an adjacent largest coding unit. For example, the current offset parameters may be reconstructed to be equal to the offset parameters of the adjacent largest coding unit. By using an offset type and offset values from among the offset parameters of the current largest coding unit, each of reconstructed pixels of largest coding units of the reconstructed frame 1295 may be adjusted by an offset value corresponding to a category according to the edge type or the band type.

FIG. 13 illustrates deeper coding units according to depths, and partitions, according to an embodiment of the present disclosure.

The video encoding apparatus 400 according to an embodiment and the video decoding apparatus 200 according to an embodiment use hierarchical coding units so as to consider characteristics of an image. A maximum height, a maximum width, and a maximum depth of coding units may be adaptively determined according to the characteristics of the image, or may be variously set according to user requirements. Sizes of deeper coding units according to depths may be determined according to the predetermined maximum size of the coding unit.

In a hierarchical structure of coding units 1300 according to an embodiment, the maximum height and the maximum width of the coding units are each 64, and the maximum depth is 3. In this case, the maximum depth refers to a total number of times the coding unit is split from the largest coding unit to the smallest coding unit. Since a depth deepens along a vertical axis of the hierarchical structure of coding units 1300, a height and a width of the deeper coding unit are each split. Also, a prediction unit and partitions, which are bases for prediction encoding of each deeper coding unit, are shown along a horizontal axis of the hierarchical structure of coding units 1300.

That is, a coding unit 1310 is a largest coding unit in the hierarchical structure of coding units 1300, wherein a depth is 0 and a size, i.e., a height by width, is 64×64. The depth deepens along the vertical axis, and a coding unit 1320 having a size of 32×32 and a depth of 1, a coding unit 1330 having a size of 16×16 and a depth of 2, and a coding unit 1340 having a size of 8×8 and a depth of 3. The coding unit 1340 having the size of 8×8 and the depth of 3 is a smallest coding unit.

The prediction unit and the partitions of a coding unit are arranged along the horizontal axis according to each depth. In other words, if the coding unit 1310 having a size of 64×64 and a depth of 0 is a prediction unit, the prediction unit may be split into partitions include in the coding unit 1310 having the size of 64×64, i.e. a partition 1310 having a size of 64×64, partitions 1312 having the size of 64×32, partitions 1314 having the size of 32×64, or partitions 1316 having the size of 32×32.

Equally, a prediction unit of the coding unit 1320 having the size of 32×32 and the depth of 1 may be split into partitions included in the coding unit 1320 having the size of 32×32, i.e. a partition 1320 having a size of 32×32, partitions 1322 having a size of 32×16, partitions 1324 having a size of 16×32, and partitions 1326 having a size of 16×16.

Equally, a prediction unit of the coding unit 1330 having the size of 16×16 and the depth of 2 may be split into partitions included in the coding unit 1330 having the size of 16×16, i.e. a partition 1330 having a size of 16×16 included in the coding unit 1330, partitions 1332 having a size of 16×8, partitions 1334 having a size of 8×16, and partitions 1336 having a size of 8×8.

Equally, a prediction unit of the coding unit 1340 having the size of 8×8 and the depth of 3 may be split into partitions included in the coding unit 1340 having the size of 8×8, i.e. a partition 1340 having a size of 8×8 included in the coding unit 1340, partitions 1342 having a size of 8×4, partitions 1344 having a size of 4×8, and partitions 1346 having a size of 4×4.

In order to determine a depth of the largest coding unit 1310, the encoder 410 of the video encoding apparatus 400 has to perform encoding on coding units respectively corresponding to depths included in the largest coding unit 1310.

The number of deeper coding units according to depths including data in the same range and the same size increases as the depth deepens. For example, according to an embodiment of the present disclosure, four coding units corresponding to a depth of 2 may be required to cover data that is included in one coding unit corresponding to a depth of 1. Accordingly, in order to compare results of encoding the same data according to depths, the data may be encoded by using each of the coding unit corresponding to the depth of 1 and four coding units corresponding to the depth of 2.

According to another embodiment of the present disclosure, two coding units corresponding to a depth of 2 may be required to cover data that is included in one coding unit corresponding to a depth of 1. Accordingly, in order to compare results of encoding the same data according to depths, the data may be encoded by using each of the coding unit corresponding to the depth of 1 and two coding units corresponding to the depth of 2.

In order to perform encoding according to each of the depths, a minimum coding error that is a representative encoding error of a corresponding depth may be selected by performing encoding on each of prediction units of the coding units according to depths, along the horizontal axis of the hierarchical structure of coding units 1300. Alternatively, the minimum encoding error may be searched for by comparing representative encoding errors according to depths, by performing encoding for each depth as the depth deepens along the vertical axis of the hierarchical structure of coding units 1300. A depth and a partition generating the minimum encoding error in the largest coding unit 1310 may be selected as a depth and a partition mode of the largest coding unit 1310.

FIG. 14 illustrates a relationship between a coding unit and transformation units, according to an embodiment of the present disclosure.

The image encoding apparatus 400 according to an embodiment or the image decoding apparatus 200 according to an embodiment encodes or decodes an image according to coding units having sizes smaller than or equal to a largest coding unit for each largest coding unit. Sizes of transformation units for transformation during encoding may be selected based on data units that are not larger than a corresponding coding unit.

For example, in the image encoding apparatus 400 or the image decoding apparatus 200, when a size of the coding unit 1410 is 64×64, transformation may be performed by using the transformation units 1420 having a size of 32×32.

Also, data of the coding unit 1410 having the size of 64×64 may be encoded by performing the transformation on each of the transformation units having the size of 32×32, 16×16, 8×8, and 4×4, which are smaller than 64×64, and then a transformation unit having the minimum coding error with respect to an original image may be selected.

The image decoding apparatus 200 may determine at least one transformation unit split from a coding unit by using split shape information of a transformation unit which is parsed from a bitstream. The image decoding apparatus 200 may hierarchically split the transformation unit in the same manner applied to the coding unit. The coding unit may include a plurality of transformation units.

The transformation unit may have a square shape. A length of one side of the transformation unit may be the greatest common factor of a length of a height of the coding unit and a length of a width of the coding unit. For example, when the coding unit has a size of 24×16, the greatest common factor of 24 and 16 is 8. Thus, the transformation unit may be a square having a size of 8×8. The coding unit having a size of 24×16 may include six transformation units each having a size of 8×8. Since an existing transformation unit having a square shape is used, when the transformation unit is set to be a square, there may be no need for an additional basis.

However, the present disclosure is not limited thereto, and thus the image decoding apparatus 200 may determine each transformation unit included in the coding unit to have a random rectangular shape. In this case, the image decoding apparatus 200 may have a basis corresponding to the rectangular shape/

The image decoding apparatus 200 may hierarchically split, from the coding unit, a transformation unit corresponding to a depth including at least one of a current depth and a lower depth, based on the split shape information of a transformation unit. For example, when the coding unit has a size of 24×16, the image decoding apparatus 200 may split the coding unit into six transformation units each having a size of 8×8. The image decoding apparatus 200 may split at least one transformation unit from among the six transformation units into transformation units of 4×4.

The image decoding apparatus 200 may parse, from the bitstream, encoding information indicating whether transformation coefficients for the coding unit are present. When the encoding information indicates that the transformation coefficients are present, the image decoding apparatus 200 may parse, from the bitstream, sub-encoding information indicating whether transformation coefficients for each of transformation units included in the coding unit are present.

For example, when the encoding information indicates that the transformation coefficients for the coding unit are not present, the image decoding apparatus 200 may not parse the sub-encoding information. When the encoding information indicates that the transformation coefficients for the coding unit are present, the image decoding apparatus 200 may parse the sub-encoding information.

FIG. 15 illustrates a plurality of pieces of encoding information, according to an embodiment of the present disclosure.

The transmitter 420 of the image encoding apparatus 400 may encode and transmit, as split information, partition mode information 1500, prediction mode information 1510, and transformation unit size information 1520 for each coding unit corresponding to a depth.

The partition mode information 1500 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 1502 having a size of 2N×2N, a partition 1504 having a size of 2N×N, a partition 1506 having a size of N×2N, and a partition 1508 having a size of N×N. Here, the partition mode information 1500 about a current coding unit is set to indicate one of the partition 1504 having a size of 2N×N, the partition 1506 having a size of N×2N, and the partition 1508 having a size of N×N.

However, the partition type is not limited thereto and may include asymmetrical partitions, arbitrary partitions, geometrical partitions, etc. For example, a current coding unit CU_0 having a size of 4N×4N may be used after being split into one of partition types including a partition having a size of 4N×N, a partition having a size of 4N×2N, a partition having a size of 4N×3N, a partition having a size of 4N×4N, a partition having a size of 3N×4N, a partition having a size of 2N×4N, a partition having a size of 1N×4N, and a partition having a size of 2N×2N. In addition, a current coding unit CU_0 having a size of 3N×3N may be used after being split into one of partition types including a partition having a size of 3N×N, a partition having a size of 3N×2N, a partition having a size of 3N×3N, a partition having a size of 2N×3N, a partition having a size of 1N×3N, and a partition having a size of 2N×2N. In the above descriptions, a current coding unit has a square shape, however, the current coding unit may have a random rectangular shape.

The prediction mode information 1510 indicates a prediction mode of each partition. For example, the prediction mode information 1510 may indicate a mode of prediction encoding performed on a partition indicated by the partition mode information 1500, i.e., an intra mode 1512, an inter mode 1514, a skip mode 1516, or a combining mode 1518.

The transformation unit size information 1520 indicates a transformation unit to be based on when transformation is performed on a current coding unit. For example, the transformation unit may be a first intra transformation unit 1522, a second intra transformation unit 1524, a first inter transformation unit 1526, or a second inter transformation unit 1528.

The receiver 210 of the image decoding apparatus 200 according to an embodiment may extract the partition mode information 1500, the prediction mode information 1510, and the transformation unit size information 1520 for each coding unit corresponding to a depth, and may use them in encoding.

Figure 16:
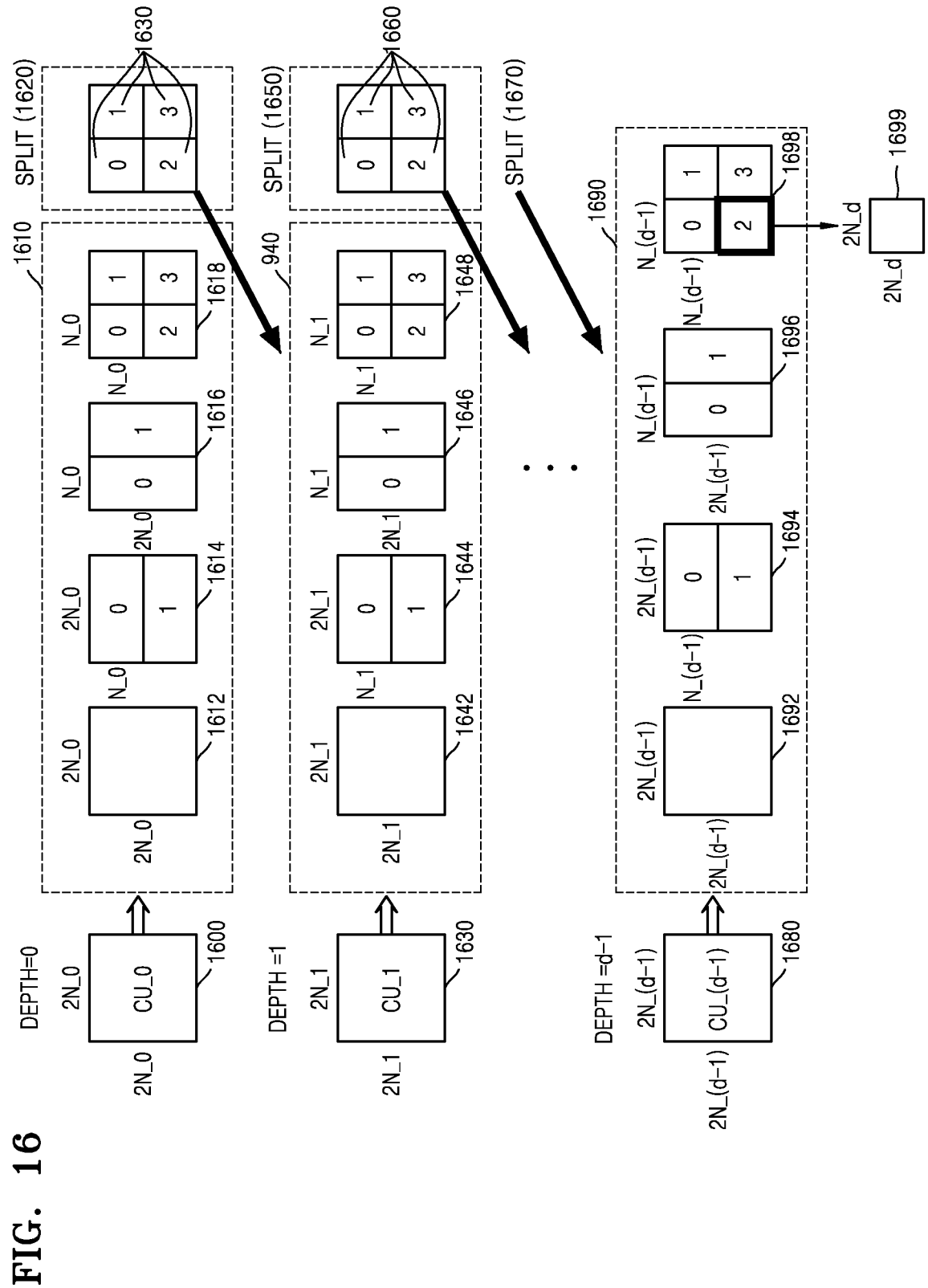
FIG. 16 illustrates deeper coding units according to depths, according to an embodiment of the present disclosure.

FIG. 16 illustrates deeper coding units according to depths, according to an embodiment of the present disclosure.

Split information may be used to represent a change in a depth. The spilt information indicates whether a coding unit of a current depth is split into coding units of a lower depth.

A prediction unit 1610 for prediction encoding a coding unit 1600 having a depth of 0 and a size of 2N_0 x2N_0 may include partitions of a partition mode 1612 having a size of 2N_0 x2N_0, a partition mode 1614 having a size of 2N_0×N_0, a partition mode 1616 having a size of N_0 x2N_0, and a partition mode 1618 having a size of N_0× N_0. Only the partition modes 1612, 1614, 1616, and 1618 which are obtained by symmetrically splitting the prediction unit are illustrated, but as described above, a partition mode is not limited thereto and may include asymmetrical partitions, partitions having a predetermined shape, and partitions having a geometrical shape.

According to each partition mode, prediction encoding has to be repeatedly performed on one partition having a size of 2N_0×2N_0, two partitions having a size of 2N_0×N_0, two partitions having a size of N_0×2N_0, and four partitions having a size of N_0×N_0. The prediction encoding in an intra mode, an inter mode, and a combination mode may be performed on the partitions having the sizes of 2N_0×2N_0, N_0×2N_0, 2N_0×N_0, and N_0×N_0. The prediction encoding in a skip mode may be performed only on the partition having the size of 2N_0×2N_0.

If an encoding error is smallest in one of the partition modes 1612, 1614, and 1616 having the sizes of 2N_0×2N_0, 2N_0×N_0 and N_0×2N_0, the prediction unit 1610 may not be split into a lower depth.

If the encoding error is the smallest in the partition mode 1618 having the size of N_0×N_0, a depth is changed from 0 to 1 and split is performed (operation 1620), and encoding may be repeatedly performed on coding units 1630 of a partition mode having a depth of 2 and a size of N_0×N_0 so as to search for a minimum encoding error.

A prediction unit 1640 for prediction encoding the coding unit 1630 having a depth of 1 and a size of 2N_1×2N_1 (=N_0×N_0) may include a partition mode 1642 having a size of 2N_1×2N_1, a partition mode 1644 having a size of 2N_1×N_1, a partition mode 1646 having a size of N_1×2N_1, and a partition mode 1648 having a size of N_1×N_1.

If an encoding error is the smallest in the partition mode 1648 having the size of N_1×N_1, a depth is changed from 1 to 2 and split is performed (in operation 1650), and encoding may be repeatedly performed on coding units 1660 having a depth of 2 and a size of N_2×N_2 so as to search for a minimum encoding error.

When a maximum depth is d, deeper coding units according to depths may be set until when a depth corresponds to d−1, and split information may be set until when a depth corresponds to d−2. In other words, when encoding is performed up to when the depth is d−1 after a coding unit corresponding to a depth of d−2 is split (in operation 1670), a prediction unit 1690 for prediction encoding a coding unit 1680 having a depth of d−1 and a size of 2N_(d−1)×2N_(d−1) may include partitions of a partition mode 1692 having a size of 2N_(d−1)×2N_(d−1), a partition mode 1694 having a size of 2N_(d−1)×N_(d−1), a partition mode 1696 having a size of N_(d−1)×2N_(d−1), and a partition mode 1698 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition modes so as to search for a partition mode generating a minimum encoding error.

Even when the partition mode 1698 having the size of N_(d−1)×N_(d−1) has the minimum encoding error, since a maximum depth is d, a coding unit CU_(d−1) having a depth of d−1 is no longer split into a lower depth, and a depth for the coding units constituting a current largest coding unit 1600 is determined to be d−1 and a partition mode of the current largest coding unit 1600 may be determined to be N_(d−1)×N_(d−1). Also, since the maximum depth is d, split information for the coding unit 1652 corresponding to a depth of d−1 is not set.

A data unit 1699 may be a 'minimum unit' for the current largest coding unit. A minimum unit according to the embodiment may be a square data unit obtained by splitting a smallest coding unit having a lowermost depth by 4. By performing the encoding repeatedly, the image encoding apparatus 400 according to the embodiment may select a coding unit size causing the minimum encoding error by comparing encoding errors according to depths of the coding unit 1600 to determine a depth of the coding unit, and may set a corresponding partition mode and a prediction mode as an encoding mode.

As such, the minimum encoding errors according to depths are compared in all of the depths of 0, 1, . . . , d−1, d, and a depth having a minimum encoding error may be determined. The depth, the partition mode of the prediction unit, and the prediction mode may be encoded and transmitted as split information. Since the coding unit has to be split from a depth of 0 to a selected depth, only split information corresponding to the selected depth has to be set to '0', and split information according to depths excluding the selected depth has to be set to '1'.

The image decoding apparatus 200 according to various embodiments may extract information about a depth and a prediction unit of a coding unit 1600, and may use them in encoding a coding unit 1612. The image decoding apparatus 200 according to various embodiments may determine a depth, in which split information is 0, as a selected depth by using split information according to depths, and use split information of the corresponding depth for decoding.

Figure 17:
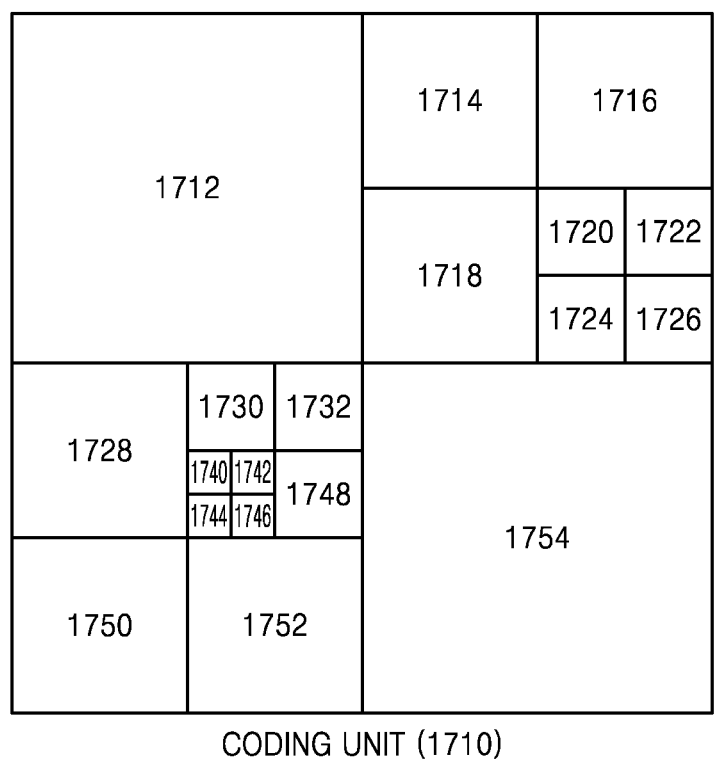
FIG. 17 illustrates a relationship between coding units, prediction units, and transformation units, according to an embodiment of the present disclosure.
Figure 18:
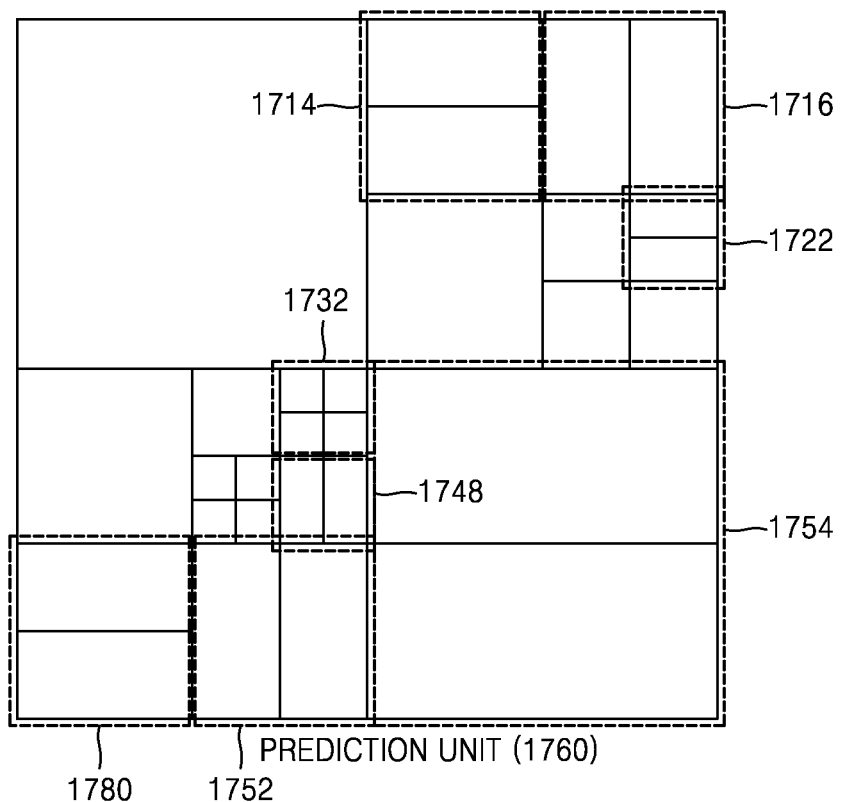
FIG. 18 illustrates a relationship between coding units, prediction units, and transformation units, according to an embodiment of the present disclosure.
Figure 19:
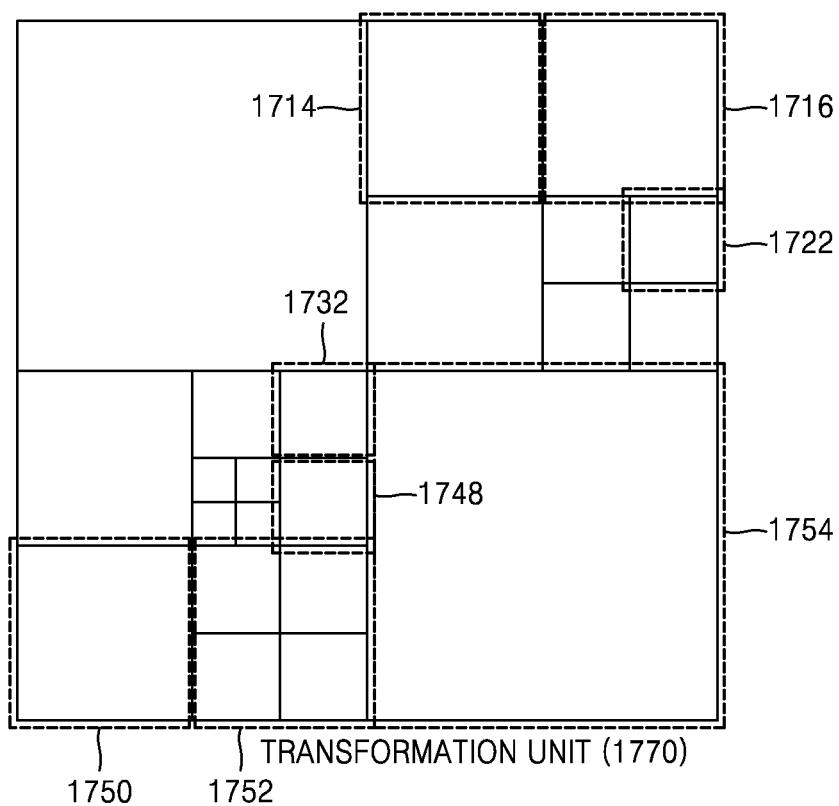
FIG. 19 illustrates a relationship between coding units, prediction units, and transformation units, according to an embodiment of the present disclosure.

FIGS. 17, 18, and 19 are diagrams for describing a relationship between coding units, prediction units, and transformation units, according to an embodiment of the present disclosure.

Coding units 1710 are deeper coding units according to depths determined by the image encoding apparatus 400, in a largest coding unit. Prediction units 1760 are partitions of prediction units of each of the coding units 1710 according to depths, and transformation units 1770 are transformation units of each of the coding units according to depths.

When a depth of a largest coding unit is 0 in the deeper coding units 1710, depths of coding units 1712 and 1754 are 1, depths of coding units 1714, 1716, 1718, 1728, 1750, and 1752 are 2, depths of coding units 1720, 1722, 1724, 1726, 1730, 1732, and 1748 are 3, and depths of coding units 1740, 1742, 1744, and 1746 are 4.

Some partitions 1714, 1716, 1722, 1732, 1748, 1750, 1752, and 1754 from among the prediction units 1760 are obtained by splitting the coding unit. That is, partitions 1714, 1722, 1750, and 1754 are a partition mode having a size of 2N×N, partitions 1716, 1748, and 1752 are a partition mode having a size of N×2N, and a partition 1732 is a partition mode having a size of N×N. Prediction units and partitions of the deeper coding units 1710 are smaller than or equal to each coding unit.

Transformation or inverse transformation is performed on image data of the coding unit 1752 in the transformation units 1770 in a data unit that is smaller than the coding unit 1752. Also, the coding units 1714, 1716, 1722, 1732, 1748, 1750, 1752, and 1754 in the transformation units 1760 are data units different from those in the prediction units 1760 in terms of sizes and shapes. That is, the image decoding apparatus 200 according to an embodiment and the image encoding apparatus 400 according to an embodiment may perform intra prediction/motion estimation/motion compensation, and transformation/inverse transformation on an individual data unit in the same coding unit Accordingly, encoding is recursively performed on each of coding units having a hierarchical structure in each region of a largest coding unit so as to determine an optimum coding unit, and thus coding units according to a recursive tree structure may be obtained. Encoding information may include split information about a coding unit, partition mode information, prediction mode information, and transformation unit size information. Table 2 below shows an example that may be set by the image decoding apparatus 200 and the image encoding apparatus 400 according to the embodiments.

of the current coding unit. If split information of the transformation unit is 1, the transformation units may be obtained by splitting the current coding unit. Also, if a partition mode of the current coding unit having the size of 2N×2N is a symmetrical partition mode, a size of a transformation unit may be N×N, and if the partition mode of the current coding unit is an asymmetrical partition mode, the size of the transformation unit may be N/2×N/2.

TABLE 2

| Split Information 0 (Encoding on Coding Unit having Size of 2N × 2N and Current Depth of d) | | | | | Split Information 1 |
|---|---|---|---|---|---|
| Prediction Mode | Partition Type | | Size of Transformation Unit | | Repeatedly Encode Coding Units having Lower Depth of d + 1 |
| Intra Inter Skip (Only 2N × 2N) | Symmetrical Partition Type | Asymmetrical Partition Type | Split Information 0 of Transformation Unit | Split Information 1 of Transformation Unit | |
| | 2N × 2N 2N × N N × 2N N × N | 2N × nU 2N × nD nL × 2N nR × 2N | 2N × 2N | N × N (Symmetrical Type) N/2 × N/2 (Asymmetrical Type) | |

The transmitter 420 of the image encoding apparatus 400 according to the embodiment may output the encoding information about the coding units having a tree structure, and the receiver 210 of the image decoding apparatus 200 according to the embodiment may extract the encoding information about the coding units having a tree structure from a received bitstream.

Split information indicates whether a current coding unit is split into coding units of a lower depth. If split information of a current depth d is 0, a current coding unit is no longer split into lower coding units from the current coding unit, thus, partition mode information, prediction mode information, and transformation unit size information may be defined for coding units corresponding to the current depth. If the current coding unit has to be further split according to the split information, encoding has to be independently performed on each of four split coding units of a lower depth.

A prediction mode may be one of an intra mode, an inter mode, and a skip mode. The intra mode and the inter mode may be defined in all partition modes, and the skip mode may be defined only in a partition mode having a size of 2N×2N.

The partition mode information may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having the sizes of 2N×nU and 2N×nD may be respectively obtained by splitting the height of the prediction unit in 1:3 and 3:1, and the asymmetrical partition modes having the sizes of nL×2N and nR×2N may be respectively obtained by splitting the width of the prediction unit in 1:3 and 3:1.

The size of the transformation unit may be set to be two types in the intra mode and two types in the inter mode. That is, if split information of the transformation unit is 0, the size of the transformation unit may be 2N×2N, which is the size The encoding information about coding units having a tree structure according to an embodiment may be assigned to at least one of a coding unit corresponding to a depth, a prediction unit, and a minimum unit. The coding unit corresponding to the depth may include at least one of a prediction unit and a minimum unit containing the same encoding information.

Accordingly, it is determined whether adjacent data units are included in the coding unit corresponding to the same depth by comparing a plurality of pieces of encoding information of the adjacent data units. Also, a corresponding coding unit corresponding to a depth is determined by using encoding information of a data unit, and thus a distribution of depths in a largest coding unit may be inferred.

Accordingly, if a current coding unit is predicted based on adjacent data units, encoding information of data units in deeper coding units adjacent to the current coding unit may be directly referred to and used.

In another embodiment, if a current coding unit is prediction-encoded based on adjacent data units, the adjacent data units may be referred to in a manner that data adjacent to the current coding unit is searched for in deeper coding units by using encoding information of the deeper coding units adjacent to the current coding unit.

Figure 20:
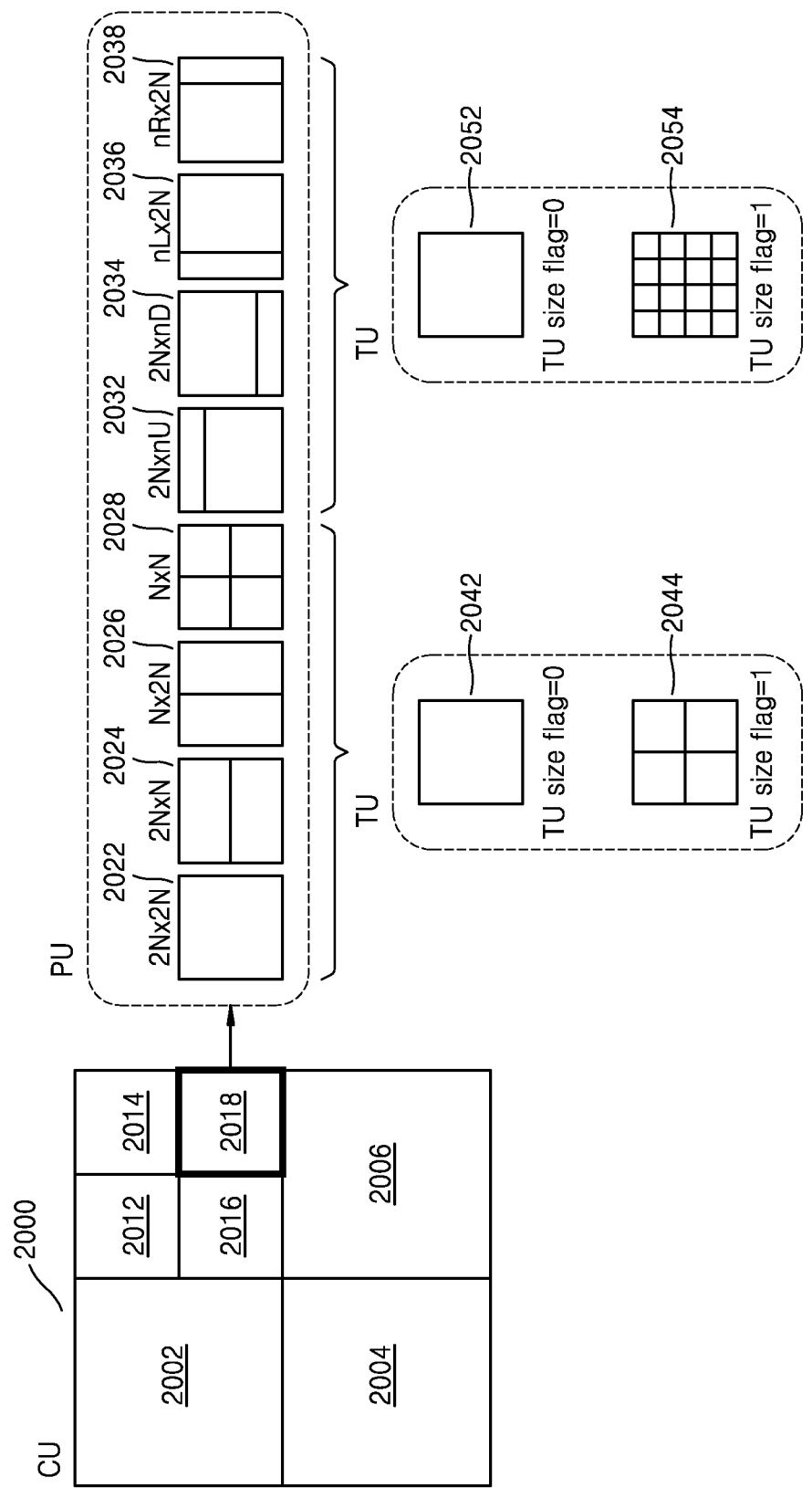
FIG. 20 illustrates a relationship between a coding unit, a prediction unit, and a transformation unit, according to encoding mode information of Table 2.

FIG. 20 illustrates a relationship between a coding unit, a prediction unit, and a transformation unit, according to encoding mode information of Table 2.

A largest coding unit 20300 includes coding units 2002, 2004, 2006, 2012, 2014, 2016, and 2018 of depths. Here, since the coding unit 2018 is a coding unit of a depth, split information may be set to 0. Partition mode information of the coding unit 2018 having a size of 2N×2N may be set to be one of partition modes including 2N×2N 2022, 2N×N 2024, N×2N 2026, N×N 2028, 2N×nU 2032, 2N×nD 2034, nL×2N 2036, and nR×2N 2038.

Transformation unit split information (TU size flag) is a type of a transformation index, and a size of a transformation unit corresponding to the transformation index may be changed according to a prediction unit type or partition mode of the coding unit.

For example, when the partition mode information is set to be one of symmetrical partition modes 2N×2N 2022, 2N×N 2024, N×2N 2026, and N×N 2028, if the transformation unit split information is 0, a transformation unit 2042 having a size of 2N×2N is set, and if the transformation unit split information is 1, a transformation unit 2044 having a size of N×N may be set.

When the partition mode information is set to be one of asymmetrical partition modes 2N×nU 2032, 2N×nD 2034, nL×2N 2036, and nR×2N 2038, if the transformation unit split information (TU size flag) is 0, a transformation unit 2052 having a size of 2N×2N may be set, and if the transformation unit split information is 1, a transformation unit 2054 having a size of N/2×N/2 may be set.

The transformation unit split information (TU size flag) described above with reference to FIG. 19 is a flag having a value or 0 or 1, but the transformation unit split information according to an embodiment is not limited to a flag having 1 bit, and the transformation unit may be hierarchically split while the transformation unit split information increases in a manner of 0, 1, 2, 3. etc., according to setting. Split information (TU size flag) of a transformation unit may be an example of a transformation index.

In this case, the size of a transformation unit that has been actually used may be expressed by using the transformation unit split information according to the embodiment, together with a maximum size of the transformation unit and a minimum size of the transformation unit. The image encoding apparatus 400 according to the embodiment may encode maximum transformation unit size information, minimum transformation unit size information, and maximum transformation unit split information. The result of encoding the maximum transformation unit size information, the minimum transformation unit size information, and the maximum transformation unit split information may be inserted into an SPS. The image decoding apparatus 200 according to the embodiment may decode video by using the maximum transformation unit size information, the minimum transformation unit size information, and the maximum transformation unit split information.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit may be defined by Equation (11):

$$\text{CurrMinTuSize}=\max(\text{MinTransformSize},\text{RootTuSize}/(2^{\text{MaxTransformSizeIndex}})) \quad (11)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (11), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a larger value from among 'RootTuSize/(2^MaxTransformSizeIndex)' and 'MinTransformSize' may be the current minimum transformation unit size 'CurrMinTuSize' that can be determined in the current coding unit.

According to an embodiment, the maximum transformation unit size RootTuSize may vary according to the type of a prediction mode.

For example, if a current prediction mode is an inter mode, then 'RootTuSize' may be determined by using Equation (12) below. In Equation (12), 'MaxTransformSize' denotes a maximum transformation unit size, and 'PUSize' denotes a current prediction unit size.

$$\text{RootTuSize}=\min(\text{MaxTransformSize},\text{PUSize}) \quad (12)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (13) below. 'PartitionSize' denotes the size of the current partition unit.

$$\text{RootTuSize}=\min(\text{MaxTransformSize},\text{PartitionSize}) \quad (13)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an embodiment, and a factor for determining the current maximum transformation unit size is not limited thereto.

According to the image encoding method based on coding units of a tree structure described above with reference to FIGS. 5 through 20, image data of a spatial domain is encoded in each of the coding units of the tree structure, and the image data of the spatial domain is reconstructed in a manner that decoding is performed on each largest coding unit according to the image decoding method based on the coding units of the tree structure, so that a video that is formed of pictures and pictures sequences may be reconstructed. The reconstructed video may be reproduced by a reproducing apparatus, may be stored in a storage medium, or may be transmitted via a network.

Also, offset parameters may be signaled with respect to each picture, each slice, each largest coding unit, each of coding units having a tree structure, each prediction unit of the coding units, or each transformation unit of the coding units. For example, pixel values of reconstructed pixels of each largest coding unit may be adjusted by using offset values reconstructed based on received offset parameters, and thus a largest coding unit having a minimum error between an original block and the largest coding unit may be reconstructed.

The embodiments of the present disclosure may be written as computer programs and may be implemented in general-use digital computers that execute the programs by using a non-transitory computer-readable recording medium. Examples of the computer-readable recording medium include magnetic storage media (e.g., ROM, floppy disks, hard disks, etc.), optical recording media (e.g., CD-ROMs, or DVDs), etc.

In the specification, at least some of "~units" may be embodied as hardware. The hardware may include a processor. The processor may be a general use single or multi-chip microprocessor (e.g., Advanced RISC Machine (ARM)), a special-purpose microprocessor (e.g., a digital signal processor (DSP), a microcontroller, a programmable gate array, etc.), or the like. The processor may be called a central processing unit (CPU). At least some of "~units" may be used by combination of processors (e.g. ARM and DSP).

The hardware may also include a memory. The memory may be a random electronic component capable of storing digital information. The memory may be embodied as a random access memory (RAM), a read-only memory (ROM), a magnetic disc storage medium, an optical storage medium, a flash memory device in the RAM, an on-board memory included in a processor, an erasable programmable read-only memory (EPROM), an electrically erasable programmable read-only memory (EEPROM), registers, others, or a combination thereof.

Data and programs may be stored in the memory. The program may be executable by the processor so as to implement the methods provided in the present disclosure. The execution of the program may include using the data stored in the memory. When the processor executes instructions, various parts of the instructions may be loaded to the processor, and various segments of the data may be loaded to the processor.

While this disclosure has been particularly shown and described with reference to embodiments thereof, it will be understood by one of ordinary skill in the art that various changes in form and details may be made therein without departing from the spirit and scope of the disclosure as defined by the appended claims. The embodiments should be considered in a descriptive sense only and not for purposes of limitation. Therefore, the scope of the disclosure is defined not by the detailed description of the disclosure but by the appended claims, and all differences within the scope will be construed as being included in the present disclosure.

The invention claimed is:

1. An image decoding method comprising:
   parsing, from a bitstream, combination prediction information indicating whether to predict a current block by combining intra prediction and inter prediction,
   determining whether to perform combination prediction on the current block, based on the combination prediction information;
   obtaining, when the combination prediction is performed, a first prediction value by performing the inter prediction on the current block, and obtaining a second prediction value by performing the intra prediction on the current block;
   determining a weight for the inter prediction and a weight for the intra prediction, based on a function of a size of the current block; and
   performing the combination prediction, based on the weight for the inter prediction, the weight for the intra prediction, the first prediction value, and the second prediction value,
   wherein the weight for the inter prediction and the weight for the intra prediction are the same when the size of the current block is smaller than a predetermined value, and
   wherein the determining of the weight comprises:
      determining a reference weight that is an initial weight for the inter prediction;
      determining a reference distance between the reference picture of the inter prediction and a current picture comprising the current block;
      determining a difference between the reference distance and a distance between the reference picture of the inter prediction and the current picture comprising the current block; and
      determining the weight for the inter prediction, based on the reference weight and the difference between the distances.

2. The image decoding method of claim 1, further comprising:
   parsing usable mode information from the bitstream;
   selecting, based on the usable mode information, usable modes from among a plurality of modes related to a prediction direction comprised in the intra prediction; and
   determining a weight for each of the usable modes.

3. The image decoding method of claim 1, further comprising:
   parsing usable mode information from the bitstream;
   selecting, based on the usable mode information, usable modes from among a plurality of modes corresponding to a plurality of reference blocks to be referred to by the current block, the plurality of modes being comprised in the inter prediction; and
   determining a weight for each of the usable modes.

4. The image decoding method of claim 1, wherein the performing of the combination prediction comprises calculating Equation of (the weight for the inter prediction X the first prediction value)+(the weight for the intra prediction X the second prediction value).

5. The image decoding method of claim 1, wherein the performing of the combination prediction comprises:
   performing the combination prediction on a luminance channel; and
   performing one of the inter prediction and the intra prediction on a chrominance channel.

6. The image decoding method of claim 1, further comprising:
   parsing motion vector accuracy information from the bitstream; and
   setting accuracy of a motion vector in the inter prediction for the current block to be one of a half-pel, an integer-pel, and a 2-pel, based on the motion vector accuracy information.

7. The image decoding method of claim 1, wherein the determining of the weight comprises:
   parsing weight information about the current block from the bitstream; and
   determining the weight for the inter prediction and the weight for the intra prediction, based on the weight information.

8. The image decoding method of claim 1, wherein the current block comprises a prediction unit used in the inter prediction and a prediction unit used in the intra prediction,
   wherein the prediction unit used in the inter prediction is independently determined from the prediction unit used in the intra prediction.

9. A non-transitory computer-readable recording medium having recorded thereon a program for implementing the image decoding method of claim 1.

10. An image decoding apparatus comprising
a receiver configured to parse, from a bitstream, combination prediction information indicating whether to predict a current block by combining intra prediction and inter prediction; and
a decoder configured to determine whether to perform combination prediction on the current block, based on the combination prediction information, to obtain, when the combination prediction is performed, a first prediction value by performing the inter prediction on the current block, and obtaining a second prediction value by performing the intra prediction on the current block, to determine a weight for the inter prediction and a weight for the intra prediction, based on a function of a size of the current block, and to perform the combination prediction, based on the weight for the inter prediction, the weight for the ultra prediction, the first prediction value, and the second prediction value,
wherein the weight for the inter prediction and the weight for the intra prediction are the same when the size of the current block is smaller than a predetermined value, and
wherein the determining of the weight comprises:
 determining a reference weight that is an initial weight for the inter prediction;
 determining a reference distance between the reference picture of the inter prediction and a current picture comprising the current block;
 determining a difference between the reference distance and a distance between the reference picture of the inter prediction and the current picture comprising the current block; and
 determining the weight for the inter prediction, based on the reference weight and the difference between the distances.

11. An image encoding method comprising:
obtaining a first prediction, value by performing inter prediction on a current block;
obtaining a second prediction value by performing intra prediction on the current block;
determining a weight for the inter prediction and a weight for the intra prediction, based on a function of a size of the current block;
performing combination prediction, based on the weight for the inter prediction, the weight for the ultra prediction, the first prediction value, and the second prediction value;
determining combination prediction information regarding whether to perform combination prediction on the current block; and
transmitting a bitstream comprising at least one of the combination prediction information and weight information, using the weight,
wherein the weight for the inter prediction and the weight for the intra prediction are the same when the size of the current block is smaller than a predetermined value, and
wherein the determining of the weight comprises:
 determining a reference weight that is an initial weight for the inter prediction;
 determining a reference distance between the reference picture of the inter prediction and a current picture comprising the current block;
 determining a difference between the reference distance and a distance between the reference picture of the inter prediction and the current picture comprising the current block; and
 determining the weight for the inter prediction, based on the reference weight and the difference between the distances.

12. The image encoding method of claim 11, further comprising performing entropy coding on at least one of the combination prediction information and the weight information with a lower priority than results of the intra prediction and the inter prediction.

13. The image encoding method of claim 11, wherein the determining of the weight comprises determining the weight based on a sample value of an original pixel in the current block, the first prediction value, and the second prediction value.

14. The image encoding method of claim 13, wherein the determining of the weight comprises calculating the weight based on an expected value of a ratio of the sample value of the original pixel to the first prediction value and an expected value of a ratio of the sample value of the original pixel to the second prediction value.

* * * * *